US011570973B2

(12) United States Patent
Chadwick

(10) Patent No.: US 11,570,973 B2
(45) Date of Patent: Feb. 7, 2023

(54) AUTOMATIC LINE RELEASE SYSTEM FOR AQUATIC TRAPS

(71) Applicant: Sub Sea Sonics, LLC, San Diego, CA (US)

(72) Inventor: David Bartholomew Chadwick, San Diego, CA (US)

(73) Assignee: Sub Sea Sonics, LLC, San Diego, CA (US)

( * ) Notice: Subject to any disclaimer, the term of this patent is extended or adjusted under 35 U.S.C. 154(b) by 252 days.

(21) Appl. No.: 17/090,782

(22) Filed: Nov. 5, 2020

(65) Prior Publication Data
US 2022/0132819 A1 May 5, 2022

(51) Int. Cl.
*A01K 69/08* (2006.01)
*A01K 75/04* (2006.01)

(52) U.S. Cl.
CPC ............. *A01K 69/08* (2013.01); *A01K 75/04* (2013.01)

(58) Field of Classification Search
CPC ...................................................... A01K 69/08
See application file for complete search history.

(56) References Cited

U.S. PATENT DOCUMENTS

| | | | | |
|---|---|---|---|---|
| 3,710,500 A * | 1/1973 | Pena | ...................... | A01K 91/02 43/43.11 |
| 4,634,072 A * | 1/1987 | Stealy | .................... | A01K 97/20 250/559.07 |
| 4,747,525 A * | 5/1988 | Pennington | .......... | A01K 5/0291 222/650 |
| 5,185,950 A * | 2/1993 | Hood | ..................... | A01K 91/08 43/43.11 |
| 10,772,312 B1 * | 9/2020 | Norton | ................. | A01K 89/012 |
| 2021/0329901 A1 * | 10/2021 | Gust, III | ................ | A01K 99/00 |

* cited by examiner

*Primary Examiner* — Jessica B Wong
(74) *Attorney, Agent, or Firm* — Ahmann Kloke LLP

(57) ABSTRACT

An example line restraint system comprises a housing, a processor, a motor, a release cam, and a timer. The release cam comprises a stem portion and an arm portion. The stem portion is proximate to the housing and the arm portion may be opposite the stem portion. The stem portion may be rotatably coupled to the motor. The motor may be configured to turn the arm portion of the release cam between an open and closed state. When in the closed state, an overhang of the arm portion at least partially defines a cavity capable of retaining a release line. When in the open state, the release cam opens the cavity to enable release of the release line. The timer may receive instructions from the processor to set a particular time and to trigger the motor to turn the release cam from the closed state to the open state.

19 Claims, 21 Drawing Sheets

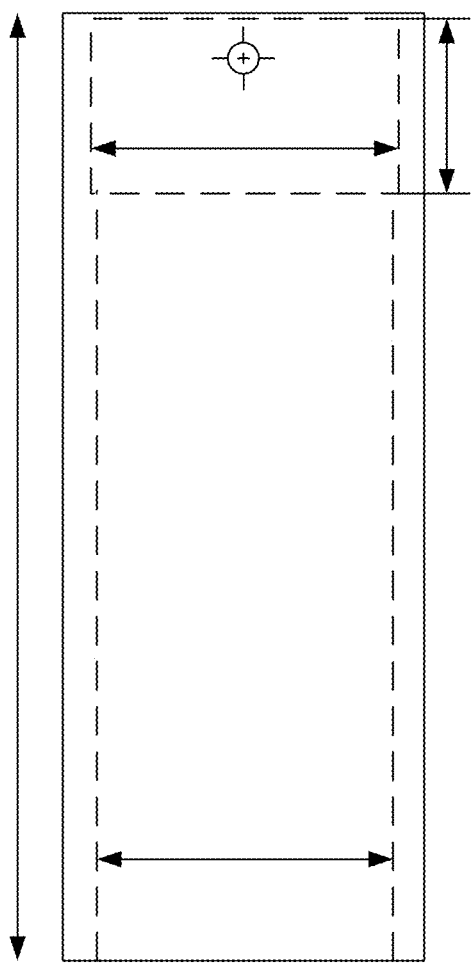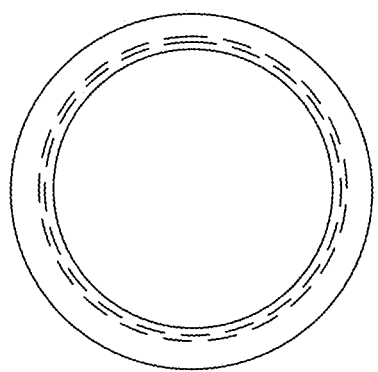
FIG. 11

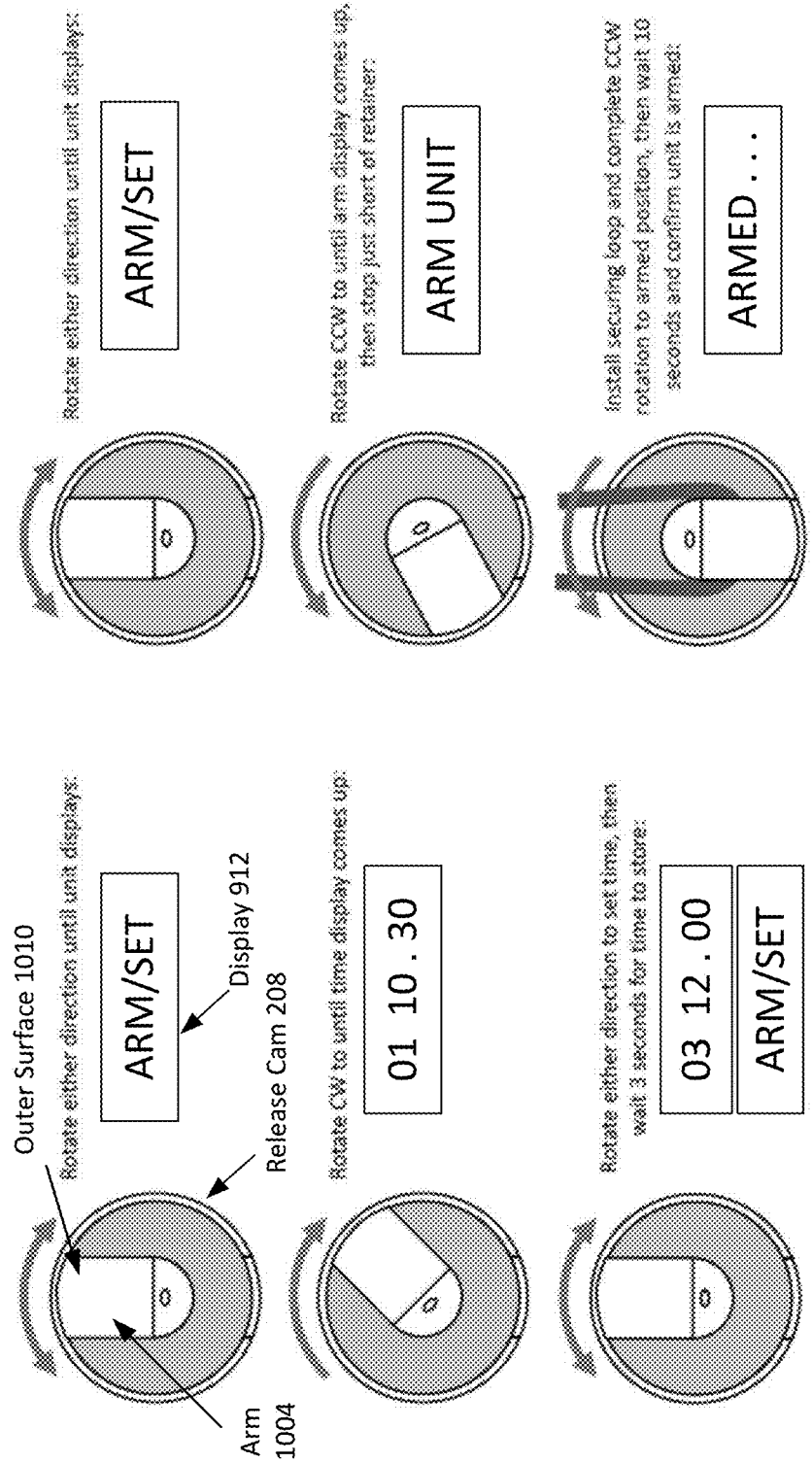

AUTOMATIC LINE RELEASE SYSTEM FOR AQUATIC TRAPS

FIELD OF THE INVENTION(S)

Embodiments of the present invention(s) related generally to aquatic traps and more particularly to aquatic traps for fishing to reduce the risk of entanglement risk to sea life.

SUMMARY

An example line restraint system comprises a housing, a processor, a motor, a release cam, and a timer. The motor may be contained within the housing. The housing may seal the motor and the processor from getting wet when the housing is submerged. The release cam may extend from the housing. The release cam may comprise a stem portion and an arm portion opposite the stem portion. The stem portion may be proximate to the housing. The arm portion may be opposite the stem portion and away from the housing. The arm portion may extend away from the stem portion of the release cam. The stem portion may be rotatably coupled to the motor. The motor may be configured to turn the arm portion of the release cam between an open and closed state. When in the closed state, an overhang of the arm portion of the release cam at least partially defining a cavity capable of retaining a release line. When in the open state, the release cam may open the cavity to enable release of the release line. The timer may be contained within the housing. The timer may be configured to receive instructions from the processor to set a particular time and capable of triggering the motor to turn the release cam from the closed state to the open state at the particular time.

In various embodiments, the release cam may include a beveled section (e.g., tapered section) opposite the stem portion that opposite the housing. The beveled section may be adjacent to or part of the arm portion. The beveled section may assist the release line to easily slip off the release cam when the release cam turns. The tapered section may be beveled or tapered at any degree of angle.

In some embodiments, the line restraint system further comprises a release line retainer coupled to the line restraint system, a portion of the release line retainer extending from the housing, and wherein in the closed state, the arm portion of the release cam being directed towards the release line retainer, the release line retainer and the overhang of the arm portion of the release came at least partially defining the cavity. The line restraint system may be capable of being coupled to an aquatic trap and capable of holding a release line in the cavity when the line restraint system is in the closed stated, thereby enabling a trap line coupled to a buoy to be restrained from rising when the aquatic trap is deployed underwater.

The particular time may be an amount of time that must pass until the timing device triggers the motor. In some embodiments, the particular time is a chronological time that must be reached until the timing device triggers the motor. In various embodiments, the processor is further configured to set the particular time through movement of the release cam. In various embodiments, turning the cam may start or set the timer. In various embodiments, the cam may be used to deactivate the timer.

The processor may be further configured to set the particular time comprises the processor receiving a first signal to change the particular time based on a clockwise turn of the release cam. In some embodiments, the processor may be further configured to set the particular time comprises the processor configured to set the particular time based on a first turn of the release cam, to increase the particular time based on a clockwise turn of the release cam, to decrease the particular time based on a counterclockwise turn of the release cam, and store the particular time based on inaction of the release cam for a particular duration.

The line restraint system may be capable of being coupled to the inside of the aquatic trap. In some embodiments, the line restraint system may be coupled to the outside of the aquatic trap.

An example method comprises receiving, by a processor of a line restraint system, a signal to set a timer, the line restraint system including a housing, the processor being within the housing, setting, by the processor, a particular time to trigger a motor to turn a release cam of the line restraint system, the motor being within the housing, the housing sealing the processor and the motor from getting wet when the housing is submerged, triggering, by the processor, the motor to turn the release cam when the particular time is reached, the release cam extending from the housing, the release cam comprising a stem portion and an arm portion opposite the stem portion, the stem portion being proximate to the housing, the arm portion being opposite the stem portion and away from the housing, the arm portion extending away from the stem portion of the release cam, the stem portion being rotatably coupled to the motor, and turning, by the motor, the arm portion of the release cam from a closed state to an open state, when in the closed state, an overhang of the arm portion of the release cam at least partially defining a cavity that is enclosed and capable of retaining a release line, when in the open state, the cavity is no longer enclosed to enable release of the release line.

BRIEF DESCRIPTION OF THE DRAWINGS

FIG. 11 depicts a side view of the line restraint device in some embodiments.

FIG. 14 depicts a process for setting a timer of the line restraint device in some embodiments.

FIG. 15 depicts a process for arming the line restraint device in some embodiments.

DETAILED DESCRIPTION

Figure 1A:
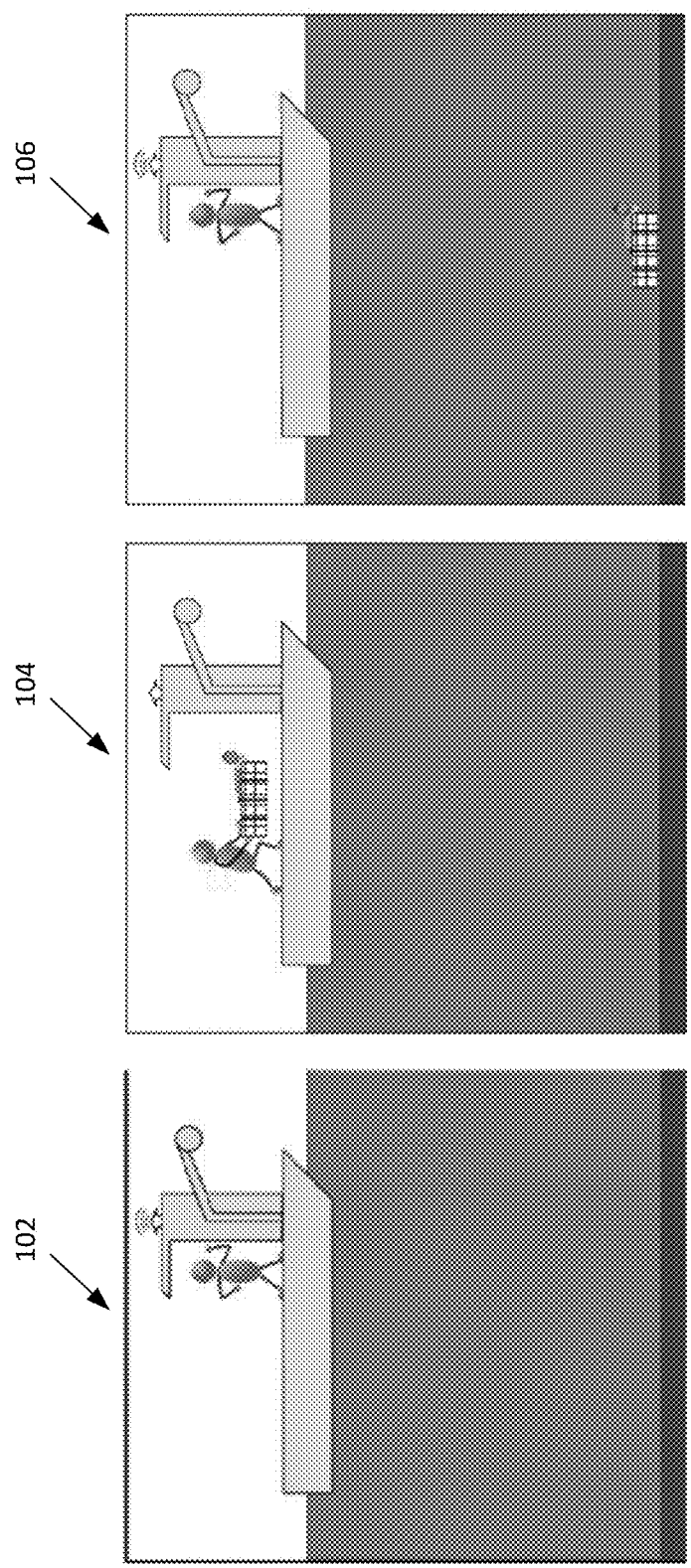
FIG. 1A depicts deployment of an aquatic trap with its trap line and buoy restrained by a line restraining system in some embodiments.

Various embodiments described herein are directed to a device to reduce recreational and commercial fishing gear entanglements. Entanglement is a threat particularly to humpback whales, grey whales, and blue whales on the West Coast. All of these species are protected under the Marine Mammal Protection Act, with blue whales listed as endangered, and humpback whales on the West Coast listed as threatened under the Endangered Species Act.

Current fishing technologies are a significant risk to large whales within the U.S. EEZ and globally. On the worldwide scale, entanglements have been documented to be a chronic problem in a broad range of previous studies. NOAA's National Report on Large Whale Entanglements (2017) for U.S. coastal waters reported that in 2017, 76 confirmed cases of large whale entanglements were documented along the coasts of the United States with 70 involving live animals and six associated with dead animals, and that the five most frequently entangled large whale species were humpback whales, gray whales, minke whales, blue whales, and North Atlantic right whales. Geographically, more than 50% of all entanglement reports occurred in California (32.9%) and Massachusetts (26.6%) waters. On the east coast of the U.S. much of the focus on whale entanglement issues has been with the North Atlantic right whale population due to the combination of its endangered status, the strong overlap between whales and fisheries, and the significant number of mortalities relative to sustainability of the population.

Entanglement rates on the West Coast alone are significant and have increased to a level that is comparable to the U.S. Northeast and Mid-Atlantic. The recent NOAA 2017 West Coast Entanglement Summary indicated that a total of 31 whales were entangled off the coasts of Washington, Oregon, and California with gear from U.S. fisheries. Humpback whales were the most common species entangled (16) along with gray whales (12) followed by blue whales (3). Two of the confirmed gray whale entanglements involved whales that were found dead. Entanglements were predominantly off the California coast (31) with gray whale entanglements most common in southern California, while humpback entanglements most common off central California.

The inherent challenge in the development of a viable rope-less fishing system is to reduce or minimize entanglement risk to marine animals such as whales without significantly impacting the viability of the fishery.

Most of the current research toward rope-less fishing technology has focused on adapting devices that were originally developed for retrieval of oceanographic instrumentation, which is generally very expensive, and the retrieval frequency is very low. As a result, retrieval equipment for such instrumentation is relatively expensive, complex, and cumbersome. The exact opposite is the case for some embodiments described herein. In various embodiments, costs for the equipment is reasonable, retrieval frequency is high, and complexity of implementation is reasonably low (complexity that slows down the fishing operation is very detrimental to the economics of fishing).

Some embodiments described herein reduces or eliminates exposure of whales to entanglement hazards in the water column. Some embodiments may be simple enough to be easily integrated into the existing fishing process without undue impact to the time and effort required to deploy and retrieve the fishing gear. The apparatus, in some embodiments, may be easily stowed within the footprint of the existing trap and does not impede the stacking of traps. Further, some embodiments provide comparable visibility on the surface to the traditional system. The system may integrate a means to determine the location and identification of the gear by fishermen and enforcement agencies in the absence of surface buoys.

Figure 1B:
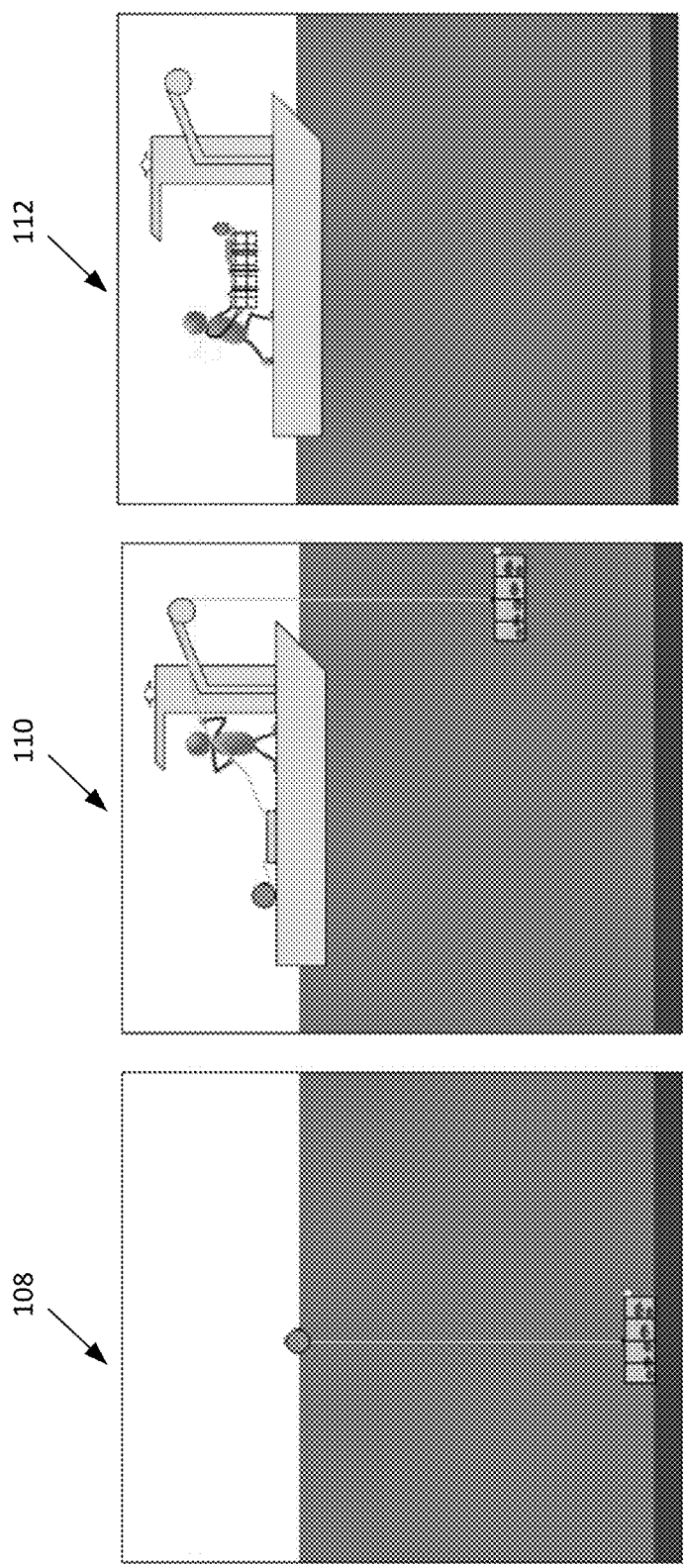
FIG. 1B depicts retrieval of an aquatic trap with its trap line and buoy released by a line restraining system in some embodiments.

FIGS. 1A and 1B include a series of images depicting the deployment of the rope-less fishery trap (i.e., an aquatic trap) according to some embodiments. In various embodiments, the system and process of use is simple enough to be integrated into the existing fishing process without undue impact on the time and effort required to deploy and retrieve the fishing gear. The system may also be stowed within the footprint of the existing aquatic trap and may not impede the stacking of traps. Some systems described herein are reliable and redundant to the degree that the amount of equipment loss is either the same or less relative to rope-based systems of the prior art. The system may also reduce or eliminate exposure of whales to entanglement hazards in a water column.

An aquatic trap is a trap that is used to capture fish, lobsters, crab, or the like, usually for the purposes of commercial fishing and sea food. It will be appreciated that various embodiments described herein may be utilized with many different types of traps for sea life.

FIG. 1A depicts deployment of an aquatic trap with its trap line and buoy restrained by a line restraining system in some embodiments. The line restraining system may include a line restraint device as discussed herein. The line restraint device may be coupled to each aquatic trap. The line restraint device may restrain the trap line and buoy from extending through the water column until a pre-programmed time. At the pre-programmed time, the line restraint device may trigger a release of the trap line (e.g., rope) and buoy from the aquatic trap, thereby allowing the buoy to rise through the water column with the trailing trap line and emerge at the surface of the water. The user may then retrieve the aquatic trap in the traditional manner.

In step 102, the user may set the line restraint system and line restraint device. The line restraint system may restrain all or part of the trap line to the aquatic trap. The trap is coupled to the trap line. The other end of the trap line is coupled to at least one float or buoy.

The trap line may be coiled and then the coiled trap line may be restrained to the outside of the aquatic trap. In one example, the coiled trap line may be held against uncoiling underwater by a release line coupled to the line restraint device. The line restraint system may include one or more restraining members (e.g., one or more bars or elongated members) connected by one end to the aquatic trap. In some embodiments, the other end of the restraining member(s) may be coupled to one end of the release line. The other end of the release line may be coupled to the line restraint device to hold the coiled trap line from uncoiling and prevent the buoy from floating to the surface.

In step 104, the user may configure the line restraint device to open or otherwise disengage with one end of the release line at a programmed time (e.g., the pop-up time). The pop-up time is the time that the line restraint device is programmed to trigger release of the trap line and buoy. In various embodiments, the line restraint device includes a timer that may be set to trigger release of the trap line and buoy. The line restraint device may include a timer-release that is preprogrammed so that the buoy may pop up out of the water just before the next visit, thus minimizing exposure and risk for entanglement of nearby whales.

After the trap line is coiled, the trap line is positioned to be held at the aquatic trap (at least in part) by the release line, and the line restraint device is set, the user may deploy the aquatic trap. The user may drop off the trap into the water, after which the aquatic trap will sink, taking the coiled trap line and the buoy restrained at or near the aquatic trap by the line restraint device.

In various embodiments, the trap line may be coiled on top of the aquatic trap and held in place by a line restraint system (e.g., including one or more restraining members or a release line). The line restraint device may include a hook or lever configured to secure the line restraint system by hooking onto a release line that holds the line restraint system in place. At a pre-programmed time, the line restraint device may pivot the hook or lever to release the release line (e.g., loosening or opening the line restraint system), thereby allowing the buoy to float to the surface and uncoil all or part of the trap line on top of the aquatic trap. The line restraint device and the line restraint system are further discussed herein.

The user may deploy any number of aquatic traps, each aquatic trap may include a coiled trap line restrained to the respective aquatic trap and held in place, at least in party, by the line restraint device. Each line restraint device may be programmed to release the line of different aquatic traps simultaneously, near simultaneously, serially, and/or the like. In some embodiments, where there are multiple aquatic traps connected together (e.g., in a "trawl line"), a single line restraint system may be used to retrieve any number of the line of aquatic traps.

FIG. 1B depicts retrieval of an aquatic trap with its trap line and buoy released by a line restraining system in some embodiments. In step 108, at a particular time, the line restraint device may disengage with the end of the release line, thereby enabling the buoy to float to the surface and pull the trap line from the aquatic trap. In another example, the release line may restrain the coiled trap line by wrapping one or more parts of the coiled trap line to the outside of the trap. When the line restraint device disengages with one end of the release line, the buoy floats towards the surface of the water and pulls the trap line away from the aquatic trap. The release line may fully or partially unfurl or unravel to enable all or part of the trap line to uncoil and allow one end of the trap line to be pulled up to the surface of the water by the buoy.

In step 110, the user may retrieve the aquatic trap using traditional techniques. For example, the trap line of the aquatic trap may be caught by the user and connected to a winch that can pull the rope and guide the trap to the boat. Fish in the trap may be retrieved, let go, or the like. In some embodiments, the winch may include an automated line coiler that coils the trap line as the aquatic trap is hauled into the boat by the winch. After being hauled in, the aquatic trap may be re-deployed with the coiled trap line.

In step 112, the aquatic trap may be re-deployed. In one example, the trap line may be coiled after retrieval (or is coiled during retrieval). The coiled trap line may be coupled to the aquatic trap with the release line. One end of the release line may be coupled to the line restraint device and the line restraint device configured to hold the line restraint device in order to restrain the coiled trap line and buoy. The user may then drop the trap back into the water.

Alternately, the user may coil the trap line and place the line within the aquatic trap. The aquatic trap may be stacked or positioned for storage. In some embodiments, the line restraint device may be connected to a part of the aquatic trap from within the aquatic trap itself, thereby enabling easy storage for the aquatic trap (e.g., the line restraint device may not interfere with stacking of storage of one or more aquatic traps).

There may be additional steps. For example, the user may optionally scan the trap. In various embodiments, the line restraint device includes a bar code, active identifier, or passive identifier that may be scanned to help identify the aquatic trap and/or the coupled line restraint device. The user may track which traps and/or line restraint devices are deployed, when they are deployed, and/or where they are deployed. In various embodiments, the line restraint device may include a sensor, tag, acoustic transceiver, and/or the like that enables the device to report a unique identifier and/or location to the user and/or a geolocation system.

The line restraint device and/or the user may provide a position of the trap and/or coupled line restraint device to a geolocation system using a satellite or cell link. In various embodiments, the line restraint device may include an acoustic transceiver configured to provide location information or enable the line restraint device to be located (e.g., through triangulation, strength of signal, and/or other methods). The user (e.g., fisherman) may utilize equipment aboard the ship or boat to receive signals from the line restraint device and then then user may update the location and/or identifier to the geolocation system using the satellite or cell link. In some embodiments, the line restraint device may communicate directly with the geolocation system to report its identification and/or location. The user and/or appropriate authorities may utilize information within the geolocation system to locate, log, and/or track any number of aquatic traps.

In some embodiments, the rope-less trap may include an acoustic tag capable of providing a rope-less trap identifier (for identification) and/or location information. For example, the acoustic tag may be or include a transceiver (e.g., within the line restraint device) that provides a signal (e.g., low frequency) that can be received by a user or enforcement agency on a boat. Each rope-less trap may include a different acoustic tag capable of providing a different identifier so each rope-less trap can be identified, even if the buoy is not deployed.

Figure 2A:
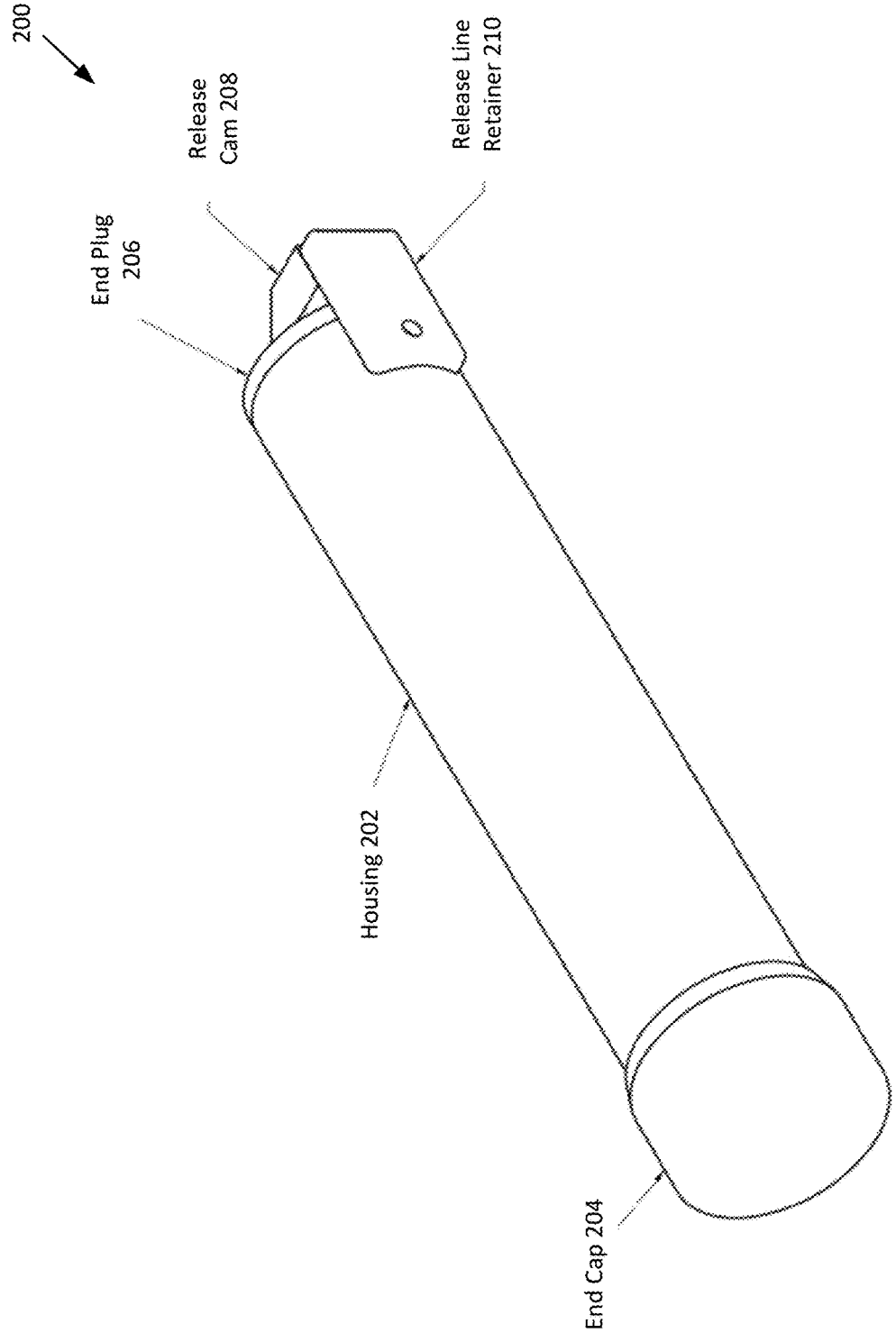
FIG. 2A depicts a first three-dimensional (3D) rendering of a line restraint device in some embodiments.

FIG. 2A depicts a first three-dimensional (3D) rendering of a line restraint device 200 in some embodiments. The line restraint device 200 may be cylindrical in shape with an end cap 204 on one end opposite the end plug 206 and release cam 208 at the other end of the line restraint device 200. While a cylindrical shaped device is depicted as being the line restraint device 200, it will be appreciated that the line restraint device 200 may be any shape, including square, circular, rectangular, polygonal, or the like.

In the example depicted in FIG. 2A, the line restraint device 200 may include a housing 202, an end cap 204, an end plug 206, a release cam 208, and a release line retainer 210. The housing 202 may contain a motor as well as a timer device.

The line restraint device 200 may be coupled to the aquatic trap through any means, including with metal hooks, bindings, or the like. In various embodiments, the line restraint device 200 is coupled to the inside of the aquatic trap. In other embodiments, the line restraint device 200 may be coupled to the outside of the aquatic trap.

The release cam 208 may form or assist in forming a cavity to hold the release line. The release line retainer 210 may keep the release line from slipping out from underneath the arm of the release cam 208. The release line retainer 210 may be affixed to the housing 202 and/or the end plug 206. In various embodiments, the release line retainer 210 includes an outer surface and an inner surface. The inner surface may be partially coupled to the line restraint device 200 (e.g., through or by the housing 202 and/or the end plug 206). The inner surface of the release line retainer 210 may extend beyond the end plug 206. When the release cam 208 is in a closed position, the face of the arm of the release cam 208 (further discussed herein) may be directed towards the inner surface of the release line retainer 210. This may form a cavity or hole through which the release line may be looped and retained when the release cam 208 is in the closed position or state. When the release cam 208 turns to the open position or state, the arm and face of the arm turn away from the inner surface of the release line retainer 210 to create an opening in the cavity and allow the release line to escape.

When set (e.g., the release cam 208 is in the closed state), the release line be coupled, retained, or held by the release cam 208 and/or the release line retainer 210. The release line holds or assists in holding the trap line in place. In various embodiments, the release cam 208 is coupled to the motor within the housing 202. At a preprogrammed time, the motor may turn the release cam 208 such that the release cam 208 is no longer touching or directed to the release line retainer 210. The release line will slide out from underneath the restraining member of the release cam 208 thereby allowing the float or buoy to float to the surface.

The release cam may include a first end that may be coupled to the motor within the housing 202, and an arm portion that is directed away from (e.g., perpendicular or substantially perpendicular) the stem end of the release cam 208. The arm may have a face which is a flat or curved end that can face the release line retainer 210 when the release cam 208 is in the closed state.

An outer surface of the release cam 208 that is opposite the stem end coupled to the motor may have a tapered section (e.g., tapered at a 45-degree angle) to assist in allowing the release line to slide away from the line restraint device 200 when the motor turns the arm of the release cam 208 away from the line restraint device 200. In other words, the beveled section (e.g., tapered section) may assist the release line (e.g., release line 302) to easily slip off the release cam 208 when the release cam 208 turns. The tapered section may be beveled or tapered at any degree of angle.

In various embodiments, the release cam 208 and/or release line retainer 210 form a cavity (e.g., hole) for holding and restraining a loop of the release line. When the release cam 208 rotates, the release line is released from the cavity.

The housing 202 may include a display screen, a motor, a processor, and a controls for setting the timer. The display screen may appear through or within the housing 202. The processor may include memory with instructions capable of setting a release time. The release time may indicate a time of day or duration (e.g., a timer). When the release time is reached, the processor will trigger the motor to turn the release cam 208 which will release the release line.

The end cap 204 and the end plug 206 provide protection and may seal the housing against water intrusion, even when the line restraint device 200 is on the sea floor.

Figure 2B:
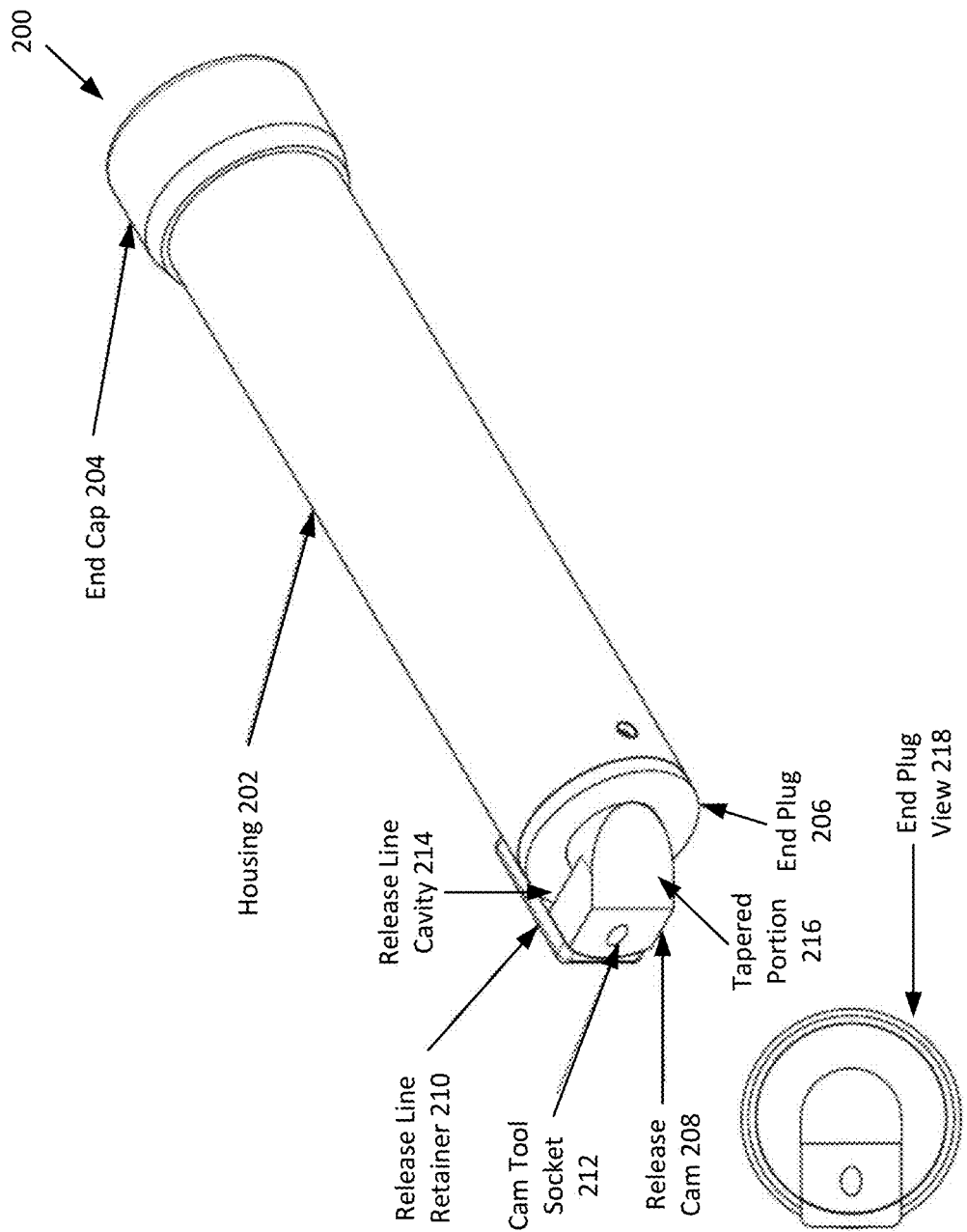
FIG. 2B depicts a second three-dimensional (3D) rendering of a line restraint device in some embodiments.

FIG. 2B depicts a second three-dimensional (3D) rendering of a line restraint device 200 in some embodiments. The line restraint device 200 may be coupled to the aquatic trap through any means, including with metal hooks, bindings, or the like. In various embodiments, the line restraint device 200 is coupled to the inside of the aquatic trap. In other embodiments, the line restraint device 200 may be coupled to the outside of the aquatic trap.

The line restraint device 200 may include the housing 202, the end cap 204, the end plug 206, the release cam 208, the release line retainer 210, and the cam tool socket 212. The release cam 208 includes the tapered portion 216. The release line cavity 214 is formed by the release cam 208 and the release line retainer 210 when the line restraint device 200 is in the closed state. FIG. 2B also includes an end plug view 218.

The release cam 208 may form or assist in forming a cavity (i.e., the release line cavity 214) to hold the release line. The release line cavity 214 may be hole or a divot within sold material. The release cam 208 may comprise one or more portions that include a stem end and an arm. The release cam 208 may, for example, form an "L" shape in which the stem end extends from the end plug 206 and the arm forms a bend with the stem end. The arm extends outwards away from the central axis of the stem end (e.g., the central axis being a longitudinal access extending through the line restraint device 200). The stem end may extend from an end of the housing 202.

The stem end may be coupled to the motor or coupled to an axel that is coupled to the motor within the housing 202. In some embodiments, the stem end is positioned at one end of the housing along a longitudinal, radial axis that runs through the middle of line restraint device 200 down the length of the device from end to end (e.g., from end plug 206 to end cap 204).

The release line retainer 210 may keep a loop of the release line from slipping out from underneath the arm of the release cam 208. The release line retainer 210 may be affixed to the housing 202 and/or the end plug 206. In various embodiments, the release line retainer 210 includes an outer surface and an inner surface. The inner surface may be partially coupled to the line restraint device 200 (e.g., through or by the housing 202 and/or the end plug 206). The inner surface of the release line retainer 210 may extend beyond the end plug 206. When the release cam 208 is in a closed position, a face of the arm of the release cam 208 (further discussed herein) may be directed towards the inner surface of the release line retainer 210. This may assist to form a cavity or hole through which the release line may be looped and retained when the release cam 208 is in the closed position or state. When the release cam 208 turns to the open position or state, the arm and face of the arm turn away from the inner surface of the release line retainer 210 to create an opening in the cavity and allow the release line to escape.

Opposite the stem end, the release cam 208 may include an arm portion. The arm portion may extend away from the longitudinal, radial axis.

As discussed herein, the release cam 208 may form a hook or lever to create the release line cavity 214 in order to hold or trap the release line (e.g., with a loop of the release line in the release line cavity 214 until the release cam 208 turns). The release line retainer 210 may keep the release line from slipping over the release cam 208 when the release cam 208 is in the closed position.

The release cam 208 may include a tapered portion 216 to assist the release line to be freed from the release line cavity 214 when the release cam 208 is in or progressing to the open state. The tapered portion 216 may be at any angle. In some embodiments, there is no tapered portions 216.

In various embodiments, the release cam 208 is coupled to the motor within the housing 202. At a preprogrammed time, the motor may turn the release cam 208 such that the release cam 208 is no longer touching or directed to the release line retainer 210 (e.g., opening the release line cavity 214 such that the release line may be freed from the line restraint device 200.

The release cam may include a first end that may be coupled to the motor within the housing 202, and a lever portion that is perpendicular (or substantially perpendicular) to the end of the housing 202. An outer end of the release cam 208 that is across from the first end coupled to the motor may have a tapered section (e.g., the tapered portion 216) to assist in allowing the release line from sliding away from the line restraint device 200 when the release cam 208 turns away from the line restraint device 200.

As discussed herein, the housing 202 may include a display screen, a motor, a processor, and controls for setting the timer. The display screen may appear through or within the housing 202. The processor may include memory with instructions capable of setting a release time. The release time may indicate a time of day or duration (e.g., a timer). When the release time is reached, the processor will trigger the motor to turn the release cam 208 which will release the release line.

The end cap 204 and the end plug 206 provide protection and may seal the housing 202 against water intrusion, even when the line restraint device 200 is on the sea floor. The end plug 206 may also seal the housing 202. The end plug may be coupled to the housing 202. The release cam 208 may be coupled to the motor within the housing 202 through the end plug 206.

The release cam 208 may include a cam tool socket 212. A cam tool may include an end that can be coupled through the cam tool socket 212 to optionally set the timer. In some embodiments, the timer is set by turning the release cam 208 as discussed herein. In some embodiments, the cam tool may be used to release the end plug 206 from the housing 202.

In various embodiments, the housing 202 includes a processor and memory configured to be able to set a pop-up time. In various embodiments, the pop-up time may be configured by turning the release cam 208 prior to deployment of the aquatic trap. For example, twisting the release cam 208 in one direction may enable the pop-up time to be set. Example processes of setting the pop-up time is discussed herein.

Figure 3A:
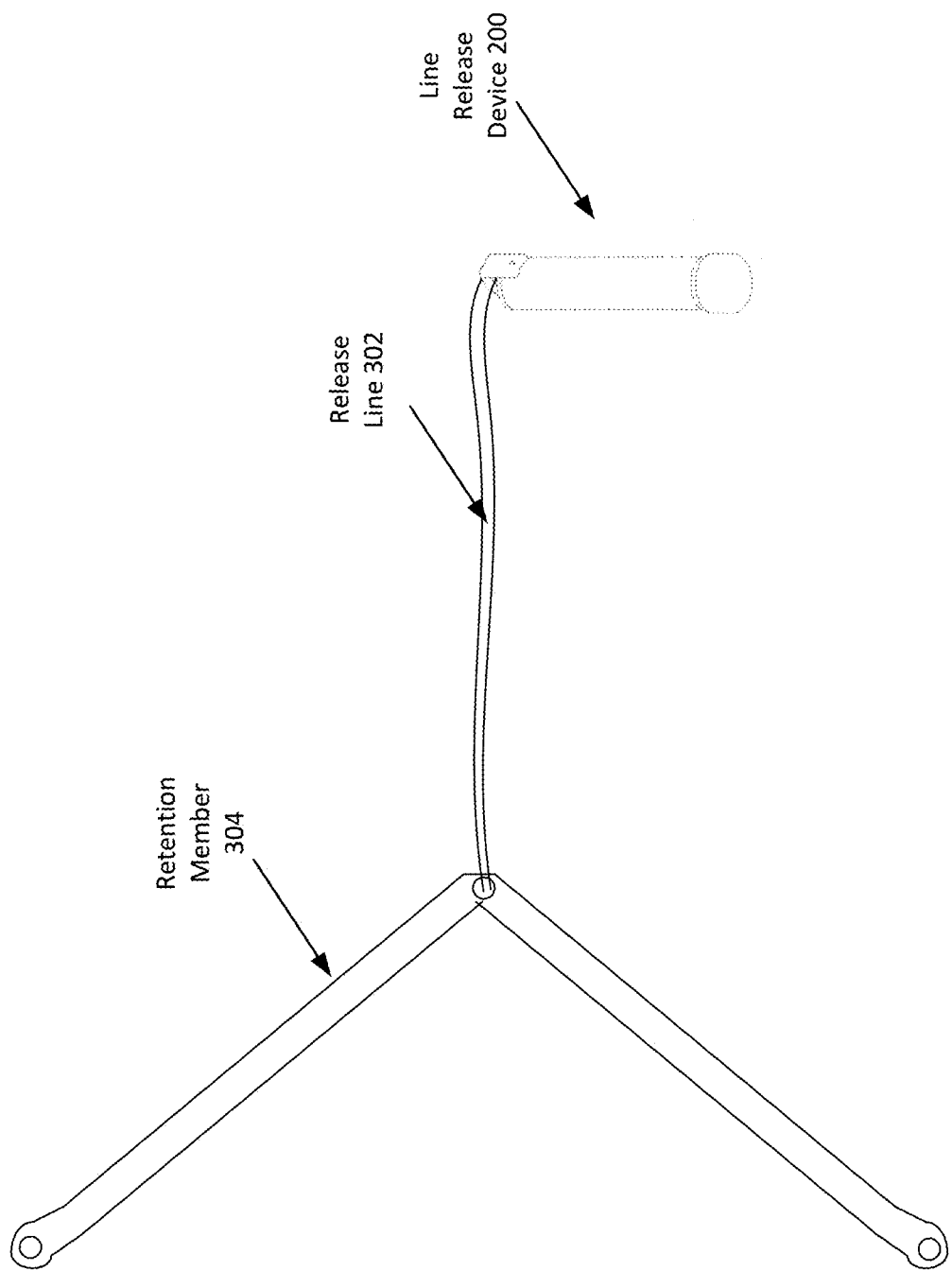
FIG. 3A depicts a line restraint system in some embodiments.

FIG. 3A depicts a line restraint device 200 in some embodiments. The line restraint system 300 may include the line restraint device 200, the release line 302, and retain member(s) 304. The retain member(s) 304 may include a single retention member 304, two retain members 304, or more. in one example, the retention member 304 may be "V" shape. Each end of the "V" shape may be coupled to the outside of an aquatic trap (e.g., through rings, hooks, rope, and/or otherwise). One point of the retention member 304 may be coupled to an end or portion of the release line 302.

The trap line may be coiled and all or of the trap line positioned underneath all or part of the retention member(s) 304. Similarly, all or part of the coiled trap line may be positioned underneath at least part of the release line 302.

Two ends of the release line 302 may be coupled to the retention member(s) 304 to forma loop. The other end of the loop of the release line 302 may be coupled to the release cam 208 of the line restraint device 200. In one example, the loop of the release line 302 may be looped around the release cam 208 and prevented from escaping by the release line retainer 210. In other example, one end of the release line may be coupled to the retention member(s) 304 and the other tied to form a loop or otherwise releasably tied or looped around the release cam 208.

There may be any number of retention members 304. In some embodiments, each retention member 304 may form a separate leg where one end of each retention member is coupled to the aquatic trap and the other end coupled or otherwise held in place by the release line 302. When the line restraint device 200 releases one end of the release line 302, the float or buoy will pull and uncoil the trap line. The pressure from the buoy will force the trap line to escape the loose and/or open retention members 304 and/or remaining release line 302.

Figure 3B:
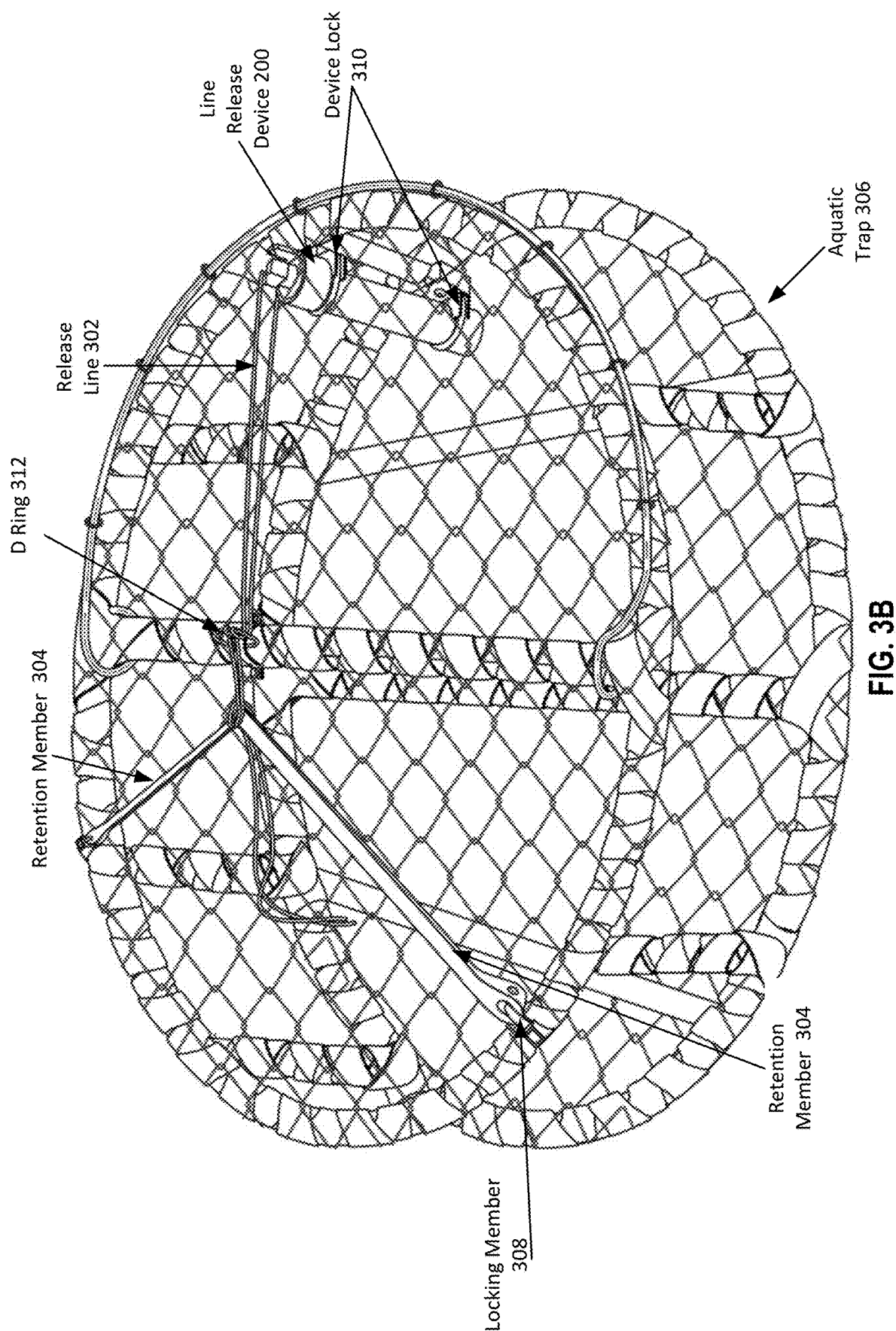
FIG. 3B depicts a circular aquatic trap with the line restraint system in some embodiments.

FIG. 3B depicts a circular aquatic trap 306 (e.g., a Dungeness crab pot) with the line restraint device 200 in some embodiments. In this example, the trap line 406 (discussed herein) may be coiled and secured to the top of the aquatic trap 502 using the release line 302 (e.g., a bungee loop) and the timed release of the line restraint device 200. Each of the retention members 304 is separately coupled to an edge of the aquatic trap 306. It will be appreciated that the retention members 304 may be coupled to any portion of the aquatic trap 306. The retention members 304 as depicted in FIG. 3B are on the outside of the aquatic trap 306. Each end of the retention members 304 that are coupled to the aquatic trap 306 may be coupled to the aquatic trap with locking member 308 which may be a ring, strap, or other connector.

In this example, the release line 302 extends from the line restraint device 200, through a loop (e.g., D ring 312) in the center of the aquatic trap 306, and then to the retention member(s) 304. The D ring 312 may be coupled to the aquatic trap 306 and the release line 302 may be wrapped around the ring (e.g., with one winding or one wrap around a part of the ring). The optional D ring 312 may serve to secure the coiled trap line 406. When the release line 302 is released from the line restraint device 200, the release line 302 may be pulled from all or part of the D ring 312 by the force of the trap line 406 being pulled by the buoy is it floats towards the surface.

Similarly, the line restraint device 200 may be coupled to the aquatic trap by one or more device locks 310. The device locks 310 may include one or more metal rings or bands configured to hold the line restraint device 200 to a portion of the aquatic trap 306 (e.g., inside the aquatic trap 306). It will be appreciated that the line restraint device 200 may be held to the aquatic trap 306 in any number of ways (e.g., using rope, a bracket, rings, straps, and/or the like).

Figure 3C:
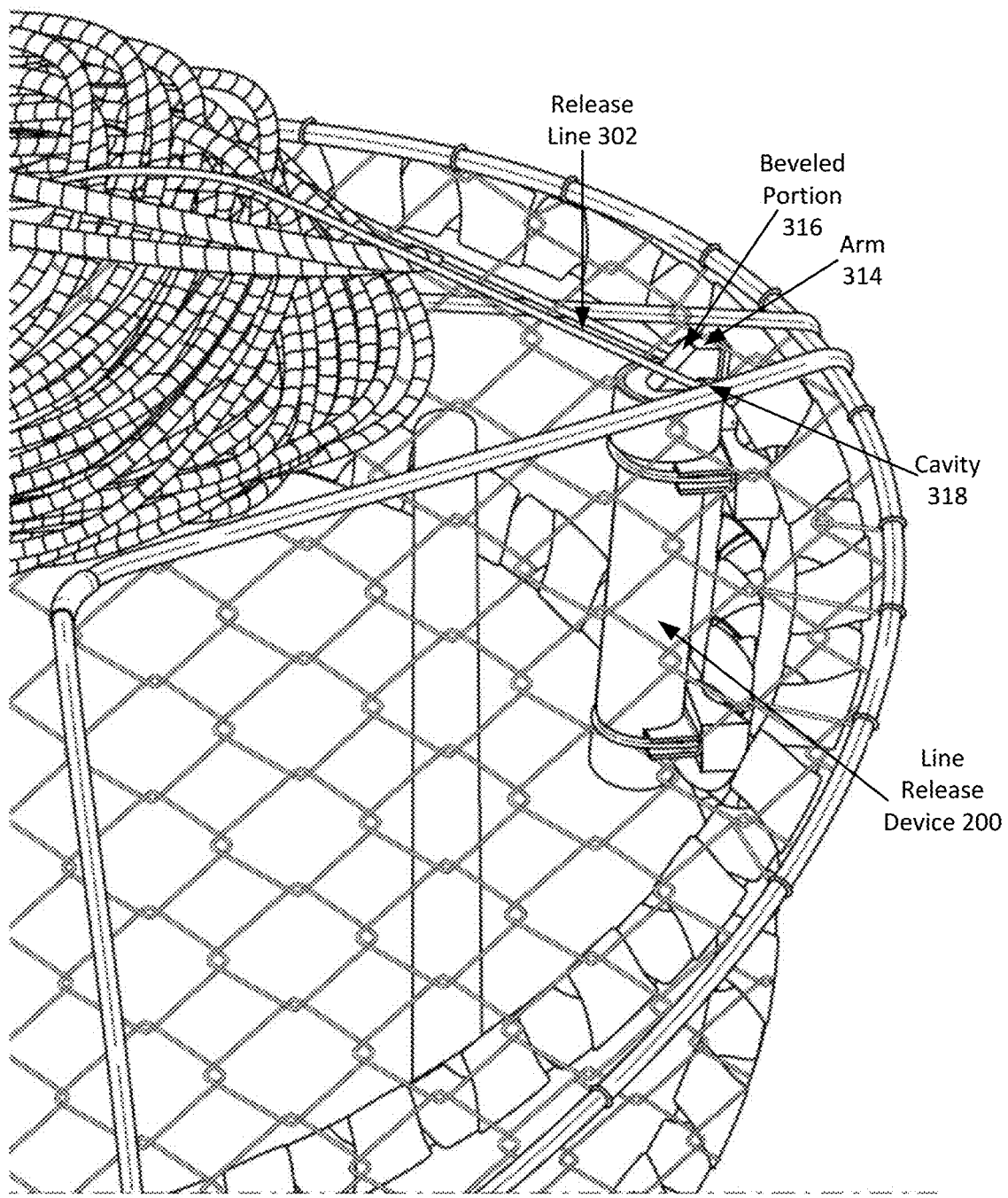
FIG. 3C depicts a close view of the circular aquatic trap with the line restraint device in some embodiments.

FIG. 3C depicts a close view of the circular aquatic trap 306 with the line restraint device 200 in some embodiments. In this figure, the release line 302 extends from the line restraint device 200 over the coiled tap line. The line restraint device 200 includes a cavity 318 formed, in part, by the arm 314 of the release cam 208. The release line 302 extends from the coiled trap line through the cavity 318. One portion of the arm 314 includes the beveled portion 316 which may assist the release line 302 from being freed from the cavity 318 when the motor in the line restraint device 200 turns the arm 314.

Figure 4:
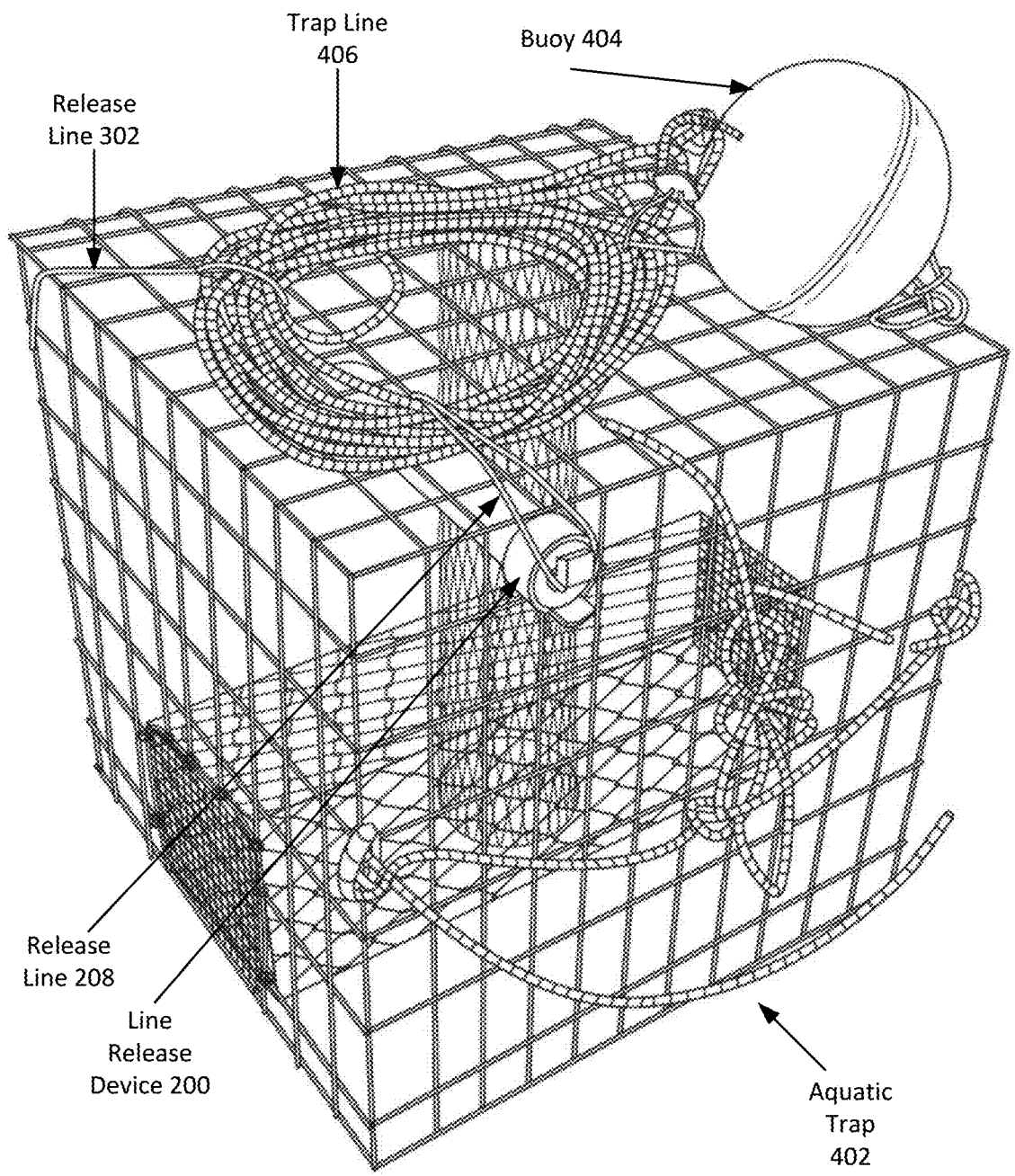
FIG. 4 depicts an image of the aquatic trap installed in a black sea bass trap according to some embodiments.

FIG. 4 depicts an image of the aquatic trap installed in a black sea bass trap according to some embodiments. In this example, there may not be retention members 304. The trap line 406 is coiled to the outside of the bass trap and held in place by looping the release line 302 around two sides of the coiled trap line 406. Two ends of the release line 302 may be tied or otherwise secured to the bass trap while a loop of the release line 302 may be wrapped around the release cam 208 of the line restraint device 200 (e.g., through a cavity that is created when the release cam 208 is in the closed position). In FIG. 4, the release cam 208 is in the "open" position thereby allowing the loop of the release line 302 to be placed in a cavity that will be defined by the release cam 208, the release line retainer 210, and the end cap 204 when the release cam 208 is turned to a "closed" position.

After the bass trap is deployed, a timer when trigger the motor to turn the release cam 208 to the open position and release the loop of the release line 302 thereby allowing the buoy 404 to float to the surface. The buoy 404 is coupled to one end of the trap line 406 and, when the release line 302 is released from the line restraint device 200, will pull the trap line 406 such that the release line 302 may further unfurl or unravel from being around the coiled trap line thereby allowing all or part of the trap line 406 to extend.

It will be appreciated that the release line 302 may be coupled to the aquatic trap and the line restraint device 200 in many different ways. In various embodiments, the release line 302 forms a loop that is hooked around the release cam 208. Once the loop escapes from the line restraint device 200 (due to the movement of the release cam 208), the coiled trap line 406 is free to be pulled by the buoy 404. When the line restraint device 200 is in the closed state the release line 302 is held in place and the buoy 404, tied to the trap line 406, is unable to rise.

It will be appreciated that it may be preferable use to alternative methods to retain the trap line 406 until the line restraint device 200 releases the release line 302. In some embodiments, only the release line 302 holds part of the coiled trap line 406 while in other embodiments, part of the coiled trap line 406 may be held in place by retaining members or the like.

Figure 5:
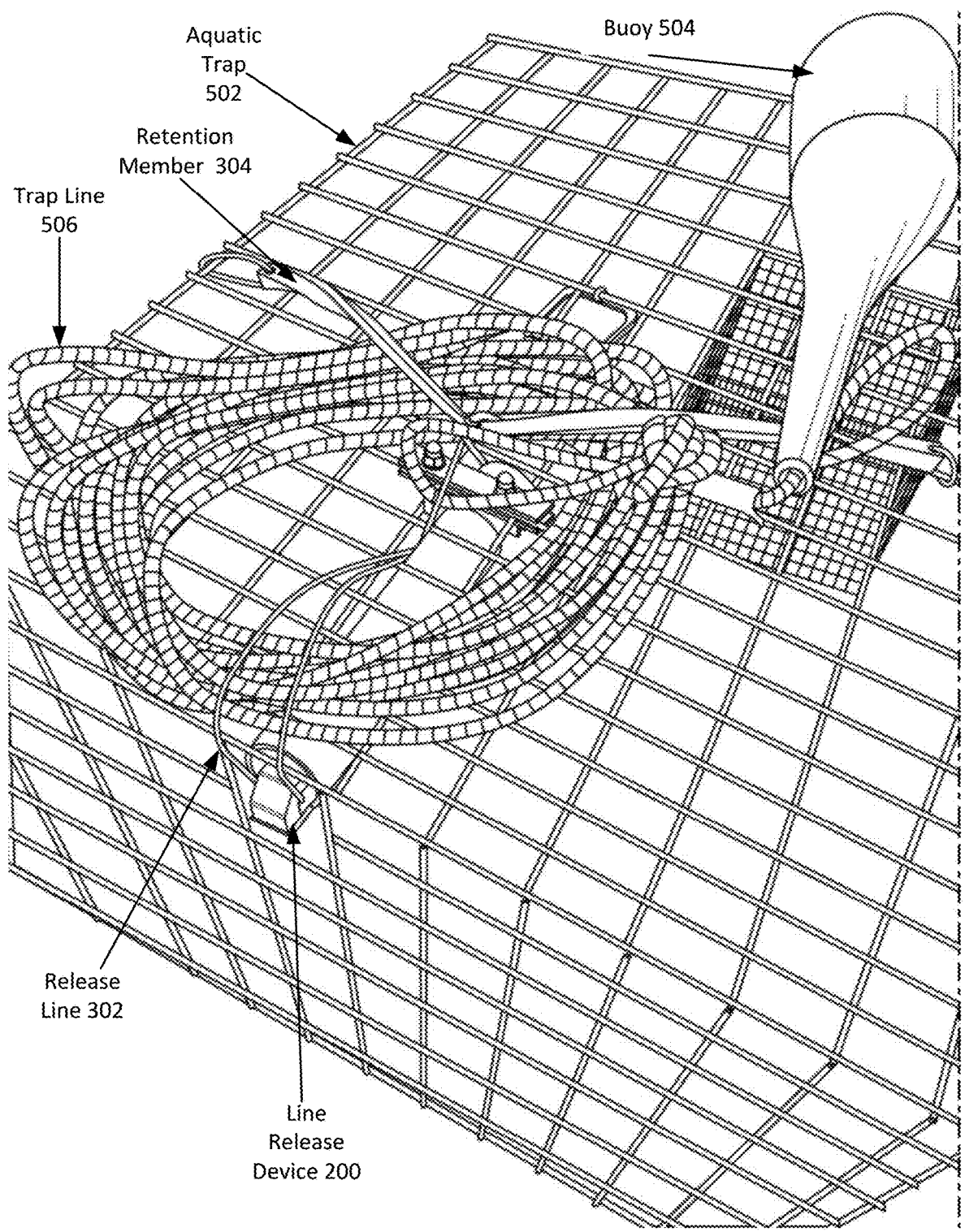
FIG. 5 depicts an image of the line restraint device installed on a lobster trap in some embodiments.

FIG. 5 depicts an image of the line restraint device installed on a lobster trap in some embodiments. As used herein, the term aquatic trap may refer to any trap for sea animals. In this image, the buoy 504 is tied t the trap line 506. The trap line is coiled and restrained by the release line 302 and the retention member 304. The retention member 304 is in a "V" configuration where the ends are connected to the aquatic trap 502 my connectors, such as rings. The center of the retention member 304 is tied or looped with the release line 302. The ends of the release line 302 may be tied to the aquatic trap 502. A loop of the release line 302 may be looped around the retention member 304, a coil of the trap line 506, and through the line restraint device 200 (e.g., underneath the release cam 208 when the release cam 208 is in the closed state.

The coil of the trap line 506 may be around the center of the retention member 304. The coil of the trap line 506 may be placed between the aquatic trap 502 and the retention member 304 to keep the trap line 506 from being pulled free by the buoy 504. Further, the coil of the trap line 506 may be constrained between the release line 302 and the aquatic trap 502.

When the release cam 208 rotates to the open state, the release line 302 may be released from the line restraint device 200 thereby freeing the release line 302 from be constrained between the release line 302 and the aquatic trap 502. Further, the release of the release line 302, may allow the coil to pull always from being between the retention member 304 and the aquatic trap 502. In some embodiments, when the release line 302 is released, the retention member 304 may loosen or open to further allow the trap line 506 to pull free. It will be appreciated that although the trap line 506 is no longer constrained by the release cam 208 and the retention member 304, one end of the trap line 506 remains tied to or otherwise connected to the aquatic trap 502.

While a single retention member 304 is discussed regarding FIG. 5, it will be appreciated that there may be any number of retention members 304. For example, each end of the retention member 304 extending from the center outwards may be a separate member.

In various embodiments, the release line 302 may be coupled to a twine or other material. The twine or other material may be, for example, degradable cotton. In one example, the release line 302 is coupled to a degradable cotton twine and the degradable cotton twine is coupled to the line restraint device 200 (e.g., through release cam 208). The degradable cotton twine may degrade underwater over a period of time. The period of time may be longer than the time set at the timer. In various embodiments, the degradable cotton twine may degrade and release the release line 302 and/or the trap line 406. In one example, the degradable cotton twine or other degradable material may provide a back up system to release the buoy and trap line even if the line restraint device 200 fails (i.e., to enable retrieval of the aquatic trap, trap line, buoy, and line restraint device 200 even if the line restraint device 200 fails).

Figure 6:
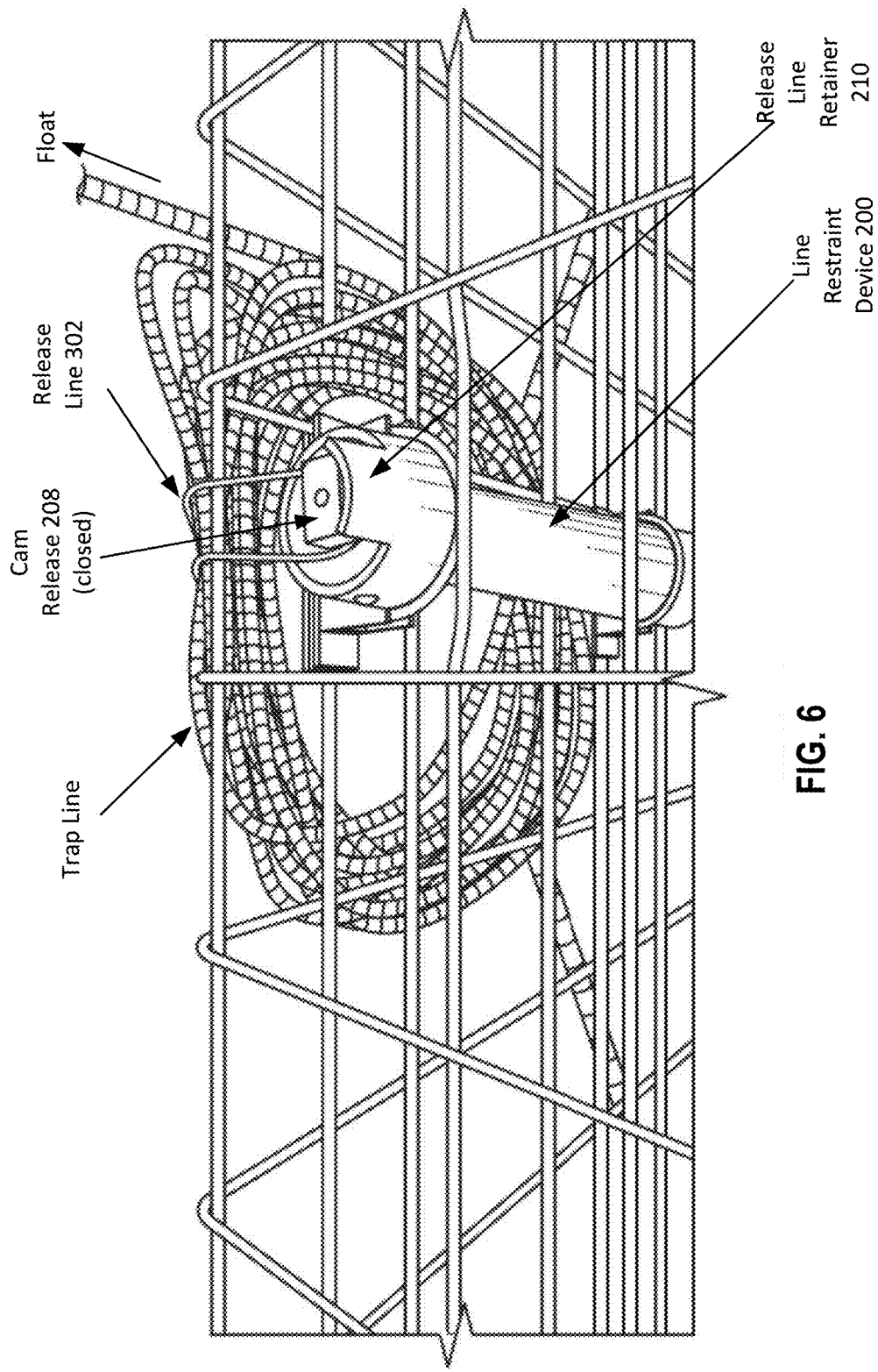
FIG. 6 depicts a line restraint device holding a release line which holds the coiled trap line in place in some embodiments.
Figure 7:
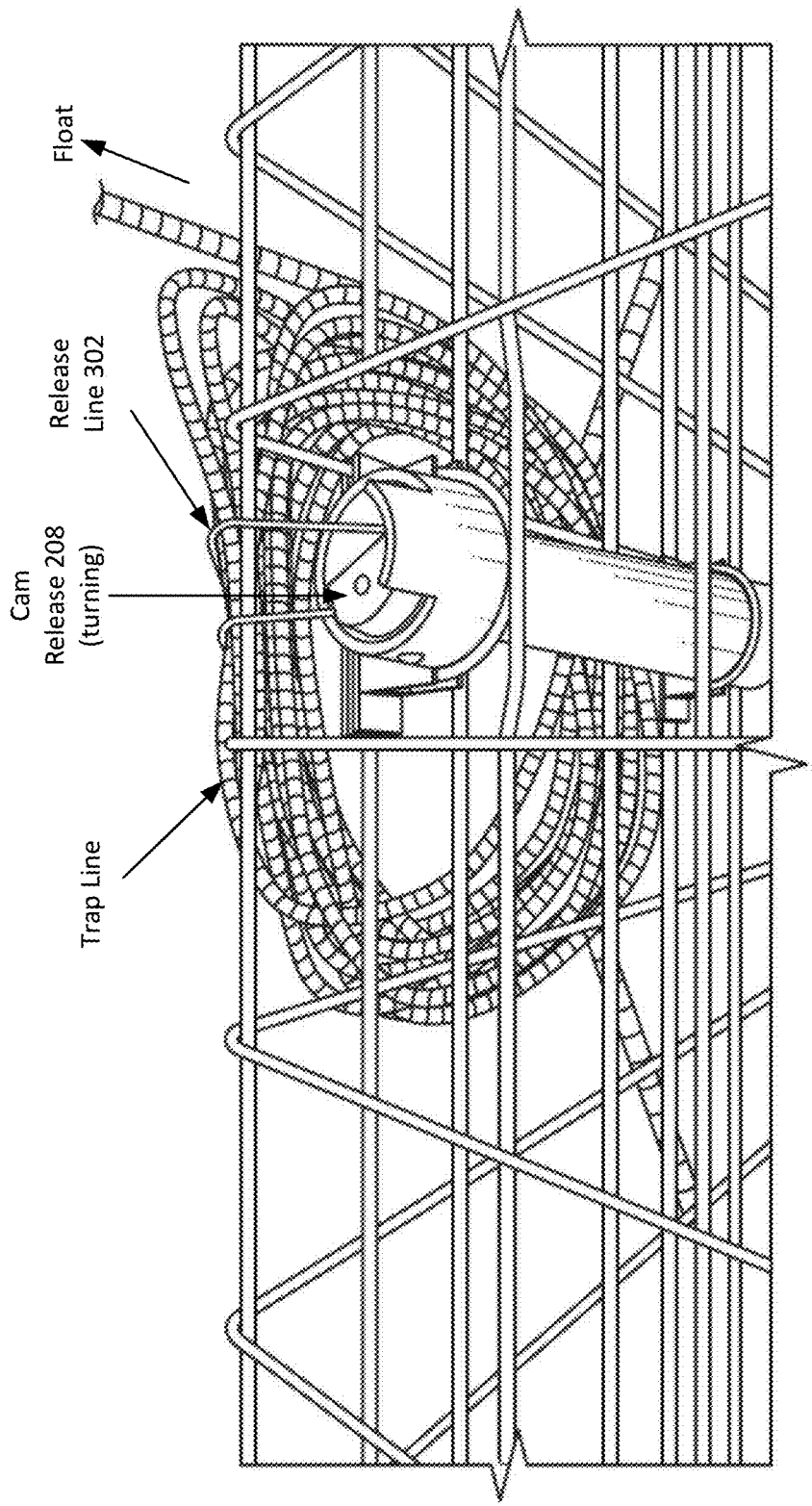
FIG. 7 depicts the line restraint device turning the release cam to release the release line and free the coiled trap line in some embodiments.
Figure 8:
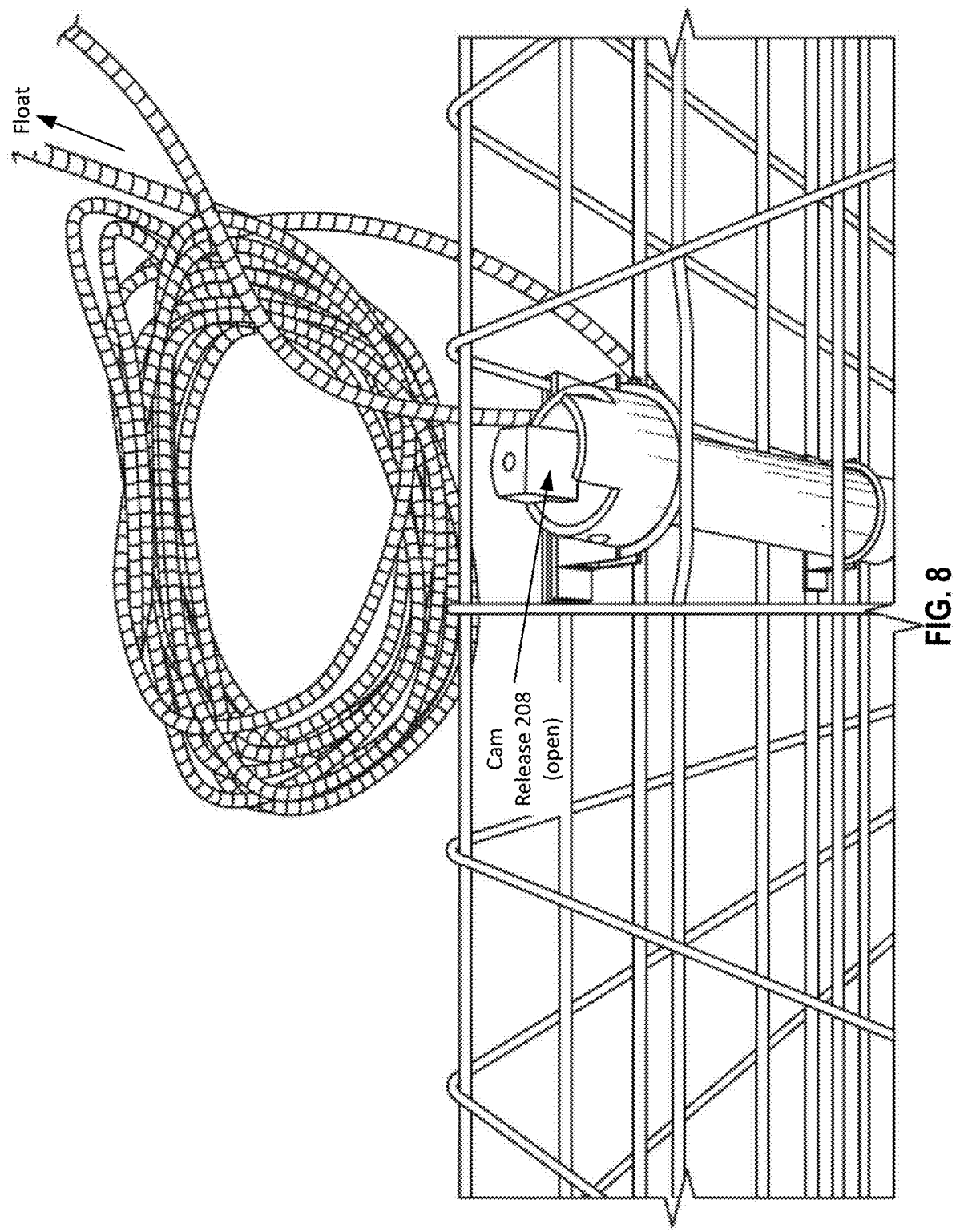
FIG. 8 depicts the line restraint device in an open state in some embodiments. the release cam may turn to open the cavity and release the release line.

FIGS. 6-8 depict the line restraint device 200 holding and releasing the release line 302 in one example. As discussed herein the timer-release of the line restraint device 200 may be preprogrammed to trigger release of the trap line so that the buoy will pop up just before the next visit, thus reducing exposure and risk for entanglement of nearby whales.

For turnaround/retrieval, the float will be at the surface when the fisherman arrives and be recovered using normal handling gear. The line restraint device 200 could then be reset, and the trap would be re-deployed.

At the time of deployment, the real-time geolocation system is used to mark the location of the trap and transmit that location to a database of regional trap locations. The geolocation system is also used to display the locations of other nearby traps so that interference can be avoided. For regulatory purposes, enforcement personnel could monitor trap deployments via the geolocation database.

FIG. 6 depicts a line restraint device 200 holding a release line 302 which holds the coiled trap line in place in some embodiments. In this figure, the aquatic trap 306 has already been deployed and is on the sea floor. The release line 302 may be, for example, a bungee cord, rope, or any other kind of line.

In FIG. 6, the release cam 208 is in the closed position where the release cam 208, the end cap 204, and the release line retainer 210 form a cavity that the release line 302 runs through. The release cam 208, the end cap 204, and the release line retainer 210 may retain or otherwise restrain the release line 302 which holds the trap line as well as the float at or near the fish cage. One end of the trap line is coupled to the float or buoy which is floating at or immediately about the aquatic trap 306. The float or buoy is constrained from floating to the surface because the trap line is held in place at least partially by the release line 302.

FIG. 7 depicts the line restraint device 200 turning the release cam 208 to release the release line 302 and free the coiled trap line in some embodiments. In FIG. 7, the timer of the line restraint device 200 has triggered the motor to turn (e.g., rotate) the release cam 208 which will open the cavity and release the loop of the release line 302 from the line restraint device 200.

FIG. 8 depicts the line restraint device 200 in an open state in some embodiments. the release cam 208 may turn to open the cavity and release the release line 302. The release line 302 may no longer restrain the coiled trap line when the line restraint device 200 is in the open state. Once the release line 302 escapes from the line restraint device 200, the buoy starts to float towards the surface. The trap line then extends between the buoy and the aquatic trap to enable retrieval of the aquatic trap.

The trap line is depicted in FIG. 8 as floating away from the aquatic trap as the float pull towards the surface.

Figure 9:
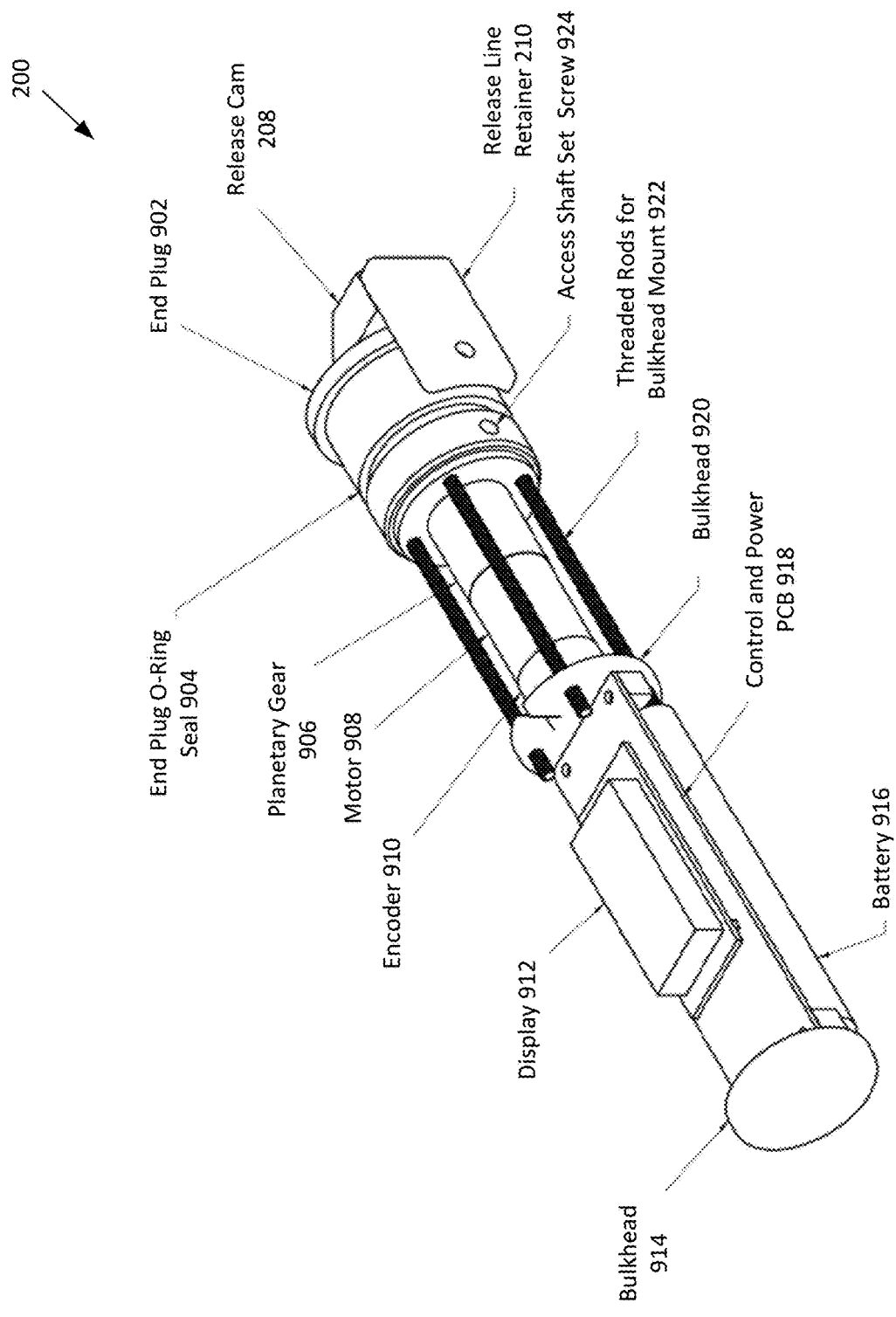
FIG. 9 depicts a 3D rendering of interior components of the line restraint device according to some embodiments.

FIG. 9 depicts a 3D rendering of interior components of the line restraint device 200 according to some embodiments. In this depiction, the housing and end cap has been removed from the line restraint device 200. It will be appreciated that the housing, end cap, and end plug 902 may seal the inner components from getting wet when the line restraint device 200 is submerged.

In various embodiments, the end cap and/or the housing may be decoupled from the end plug 902. The release line retainer 210 may be fastened to the housing in some embodiments. In various embodiments, removing the end plug 902 may allow for access to the internal parts of the line restraint device 200. For example, removal of the end plug 902 may provide access to replace batteries and/or provide maintenance to other internal parts of the line restraint device 200.

The 3D rendering of the line restraint device 200 includes the end plug 902, the release cam 208, end plug O-ring seal 904, a planetary gear 906, a motor 908, an encoder 910, a display 912, a bulkhead 914, battery 916, control and power PCB 918, bulkhead 920, threaded rods for bulkhead mount 922, access for shaft set screw 924, and a release line retainer 210.

The end plug 902 may be circular and include a hole in the center of the plug to enable the release cam 208 to be coupled with an axel that runs to the motor 908. In various embodiments, the end plug 902 may be coupled to the release line retainer 210. The motor 908 may be any motor. In one example, the gear reduction ratio of the motor 98 is 227:1 but any gear ratio may be used.

The end plug O-ring seal 904 may be coupled to or near the end plug 902. The end plug O-ring seal 904 may assist in sealing the inner workings of the line restraint device 200 from water when the device is submerged. The end plug O-ring seal 904 may also assist in keeping the housing in place and positioned at or near the end plug 902.

The planetary gear 906 may include or be a gear wheel whose axis describes a circular path around that of another wheel.

In various embodiments, the planetary gear 906 is a DC planetary gear brush motor, model number #638252 from Robotzone. The planetary gear 906 may assist in the setting of the timer. In various embodiments, the timer may be set when the line restraint device 200 is disarmed and the release cam 208 is twisted or turned by the user (e.g., fisherman) to set the timer. The planetary gear may allow the movement of the release cam 208 to bypass the motor 908 or enable the motor 908 to be manipulated in such a way as to allow movement of the release cam 208 to assist setting the timer.

Similarly, the planetary gear 906 may enable the motor to turn the release cam 208 without resetting the timer or disarming/arming the line restraint device 200.

The timer may be controlled by the control and power PCB 918. In various embodiments, the control and power PCB 918 includes a processor configured to set the timer, run the timer, and to trigger the motor 908 to open the release cam 208 from the closed state when the timer reaches a predetermined time.

By turning or otherwise manipulating the release cam 208, the encoder 910 may translate or assist in translating movements of the release cam 208 to signals that can be received by the control and power PCB 918 for setting the timer, arming the line restraint device 200, or disarming the line restraint device 200. The process is further described herein. The encoder 910 may be coupled to the motor 908 and may assist with allowing the release cam 208 to be used as a control knob for setting the timer.

The display 912 may be any display. For example, the display 912 may include an LED screen. In one example, the display 912 may depict the timer setting, whether the line restraint device 200 is armed, or whether the line restraint device 200 is disarmed. The display 912 may be monochrome (e.g., red, blue, green, black, or the like) or have any number of colors. In various embodiments, the display 912 may be within a clear housing 202 of the line restraint device 200.

The battery 916 may be any power source. In one example, the battery 916 includes any number of AA batteries, AAAA batteries, lithium batteries, or the like. In some embodiments, the battery 916 may power the display 912, the control and power PCB 918 (e.g., for the timer), and/or the motor 908. In some embodiments, the power source may include a spring/coil powered system and/or the like.

The line restraint device 200 depicted in FIG. 9 has two bulkheads including bulkhead 914 and bulkhead 920. The bulkhead 914 may provide support within the end cap not depicted. Similarly, the bulkhead 920 may provide support for the threaded rods (e.g., the bulkhead mount 922) which provides structural support and protection for the motor 908 and the planetary gear 906. The bulkhead 920 also provides support and structure for the encoder 910 to assist in the setting of the timer.

The shaft set screw 924 may be accessible through the housing of the line restraint device 200. Unscrewing the shaft set screw 924 may enable the housing to be removed to gain access to the inner workings of the line restraint device 200 (e.g., to change the battery 916).

Figure 10:
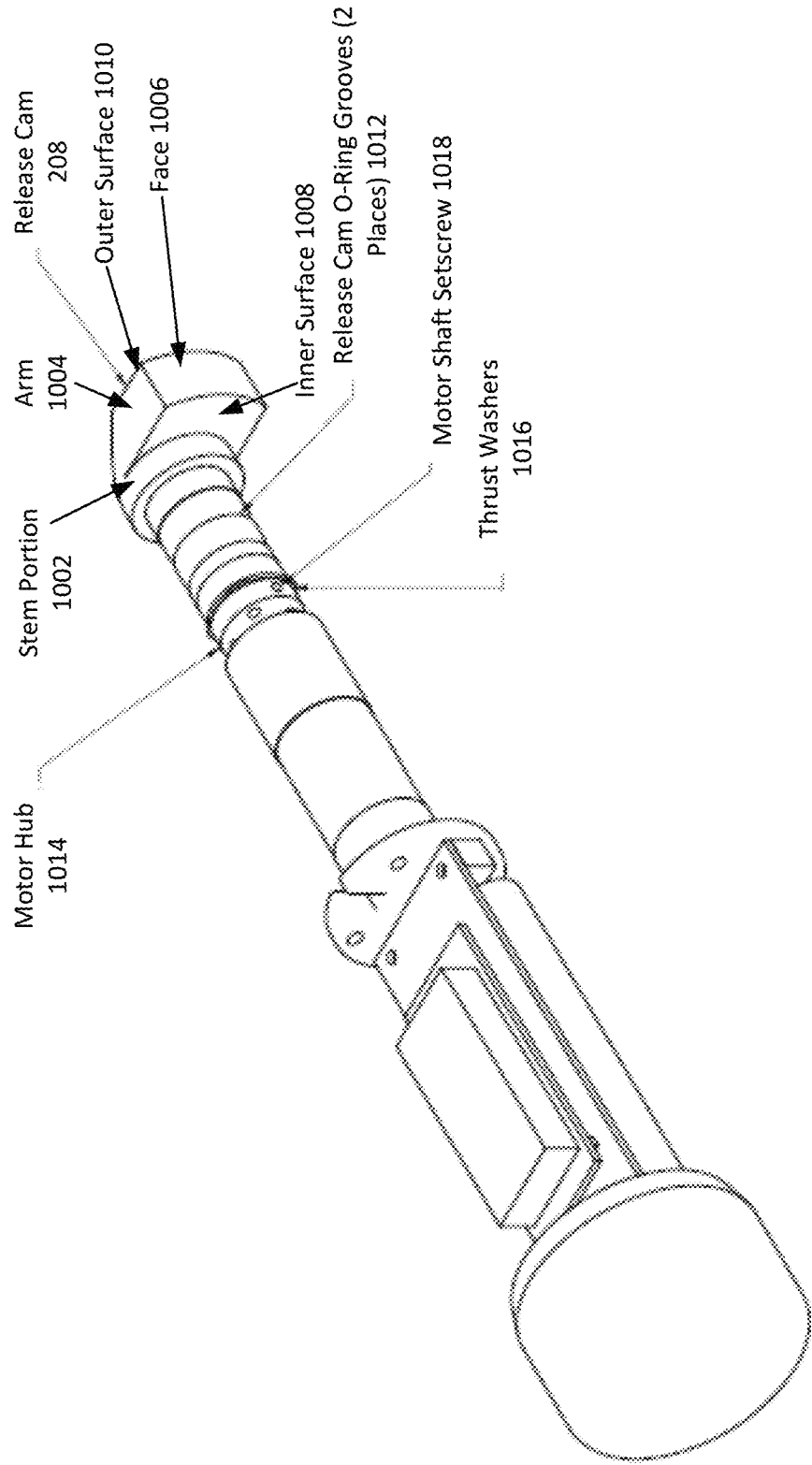
FIG. 10 depicts another 3D rendering of interior components of the line restraint device without the bulkhead mount in some embodiments.

FIG. 10 depicts another 3D rendering of interior components of the line restraint device 200 without the bulkhead mount 922 in some embodiments. FIG. 10 further depicts aspects of the release cam 208 in some embodiments. The line restraint device 200 in FIG. 10 depicts the release cam 208 as well as components of the release cam 208 including a stem portion 1002, an arm 1004, a face 1006, an inner surface 1008, and an outer surface 1010. FIG. 10 further depicts release cam O-ring grooves (2 places) 1012, a motor hub 1014, thrust washers 1016, and motor shaft setscrew 1018.

The release cam 208 may be a single piece (e.g., created from a 3D printer or machined) or include a combination of parts. The release cam 208 includes a stem 1002 which may be coupled to the motor 908 or an axel that is coupled to the motor 908. The stem 1002 may also be coupled through the planetary gears 906 to communicate with the control and power PCB 918 to set the timer (e.g., through the encoder 910). The stem portion 1002 is depicted as being round but may be any shape. In some embodiments, the stem portion 1002 does not extend to the face 1006 of the release cam 208.

The arm 1004 may be coupled to one of the stem portion 1002 opposite the end of the stem portion 1002 that is nearest to the motor 908 (e.g., opposite the end of the stem portion 1002 that is coupled to the motor 908 and/or axel from the motor). The arm 1004 and the stem portion 1002 may form an "L" shape. The arm 1004 may extend out from a linear, radial axis of the line restraint device 200 and may create an overhang. The arm 1004 may include a face 1006 that is the width or part of the width of the arm 1004. The face 1006 may be flat or curved. In various embodiments, when the line restraint device 200 is in a closed state, the face 1006 may be directed towards the release line retainer 210. The release line retainer 210 may extend from the housing of the line restraint device 200 and may touch or become proximate to the face 1006 when the release cam 208 is in the closed state. When the release cam 208 rotates to the open state, the release cam 208 may turn the arm 1004 and the face 1006 away from the release line retainer 210 to open a cavity that may hold part of the release line 302.

In various embodiments, the user (e.g., the fisherman) may turn the arm 1004 to turn the release cam 208. The user may turn the arm 1004 away from the release line retainer 210 to access the cavity (e.g., the open state) and place a loop of the release line 302 within the cavity. The user may then turn the arm 1004 toward the release line retainer 210 to close the cavity and retainer the release line 302 within the cavity. When closed, the cavity may be formed by the inner surface 2008 of the arm 1004, a portion of the stem portion 1002 (e.g., the portion facing the release line retainer 210), a portion of the release line retainer 210 (e.g., the portion of the release line retainer 210 that extends beyond the housing and/or the end plug 902 and below the face 1006), and the surface of the end plug 902 that is opposite the motor and the rest of the inner workings of the line restraint device 200. In the open state, the user may turn the arm 1004 to pull the face 1006 away from the release line retainer 210 to provide open access to the cavity.

FIG. 11 depicts a side view of the line restraint device 200 in some embodiments. The line restraint device 200 may be of any length. In this example, the total length of the line restraint device 200 may be 9.647 inches long and the end plug may be 1.550 inches long. The line restraint device 200 may be 1.670 inches in diameter.

Figure 12:
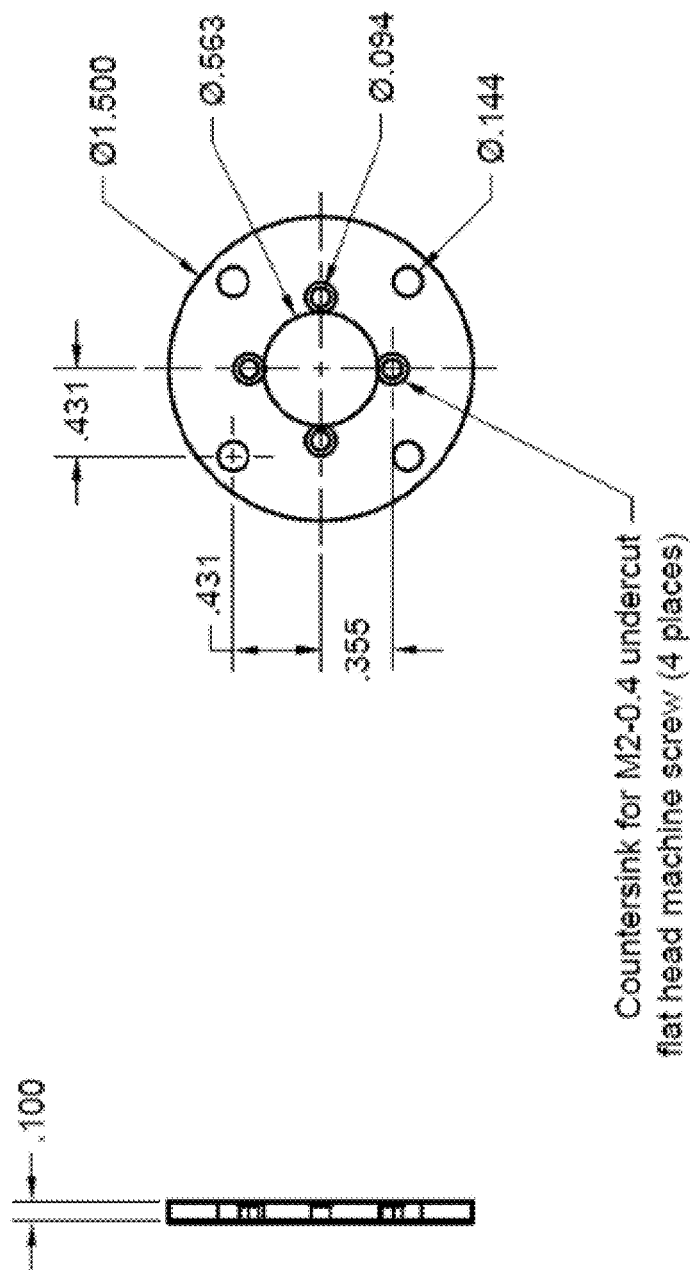
FIG. 12 depicts a view of a motor mount in some embodiments.

FIG. 12 depicts a view of a motor mount in some embodiments. The motor mount may mount the motor to the line restraint device 200 (e.g., within the bulkhead mount 922). Measurements may be in inches in this example.

Figure 13:
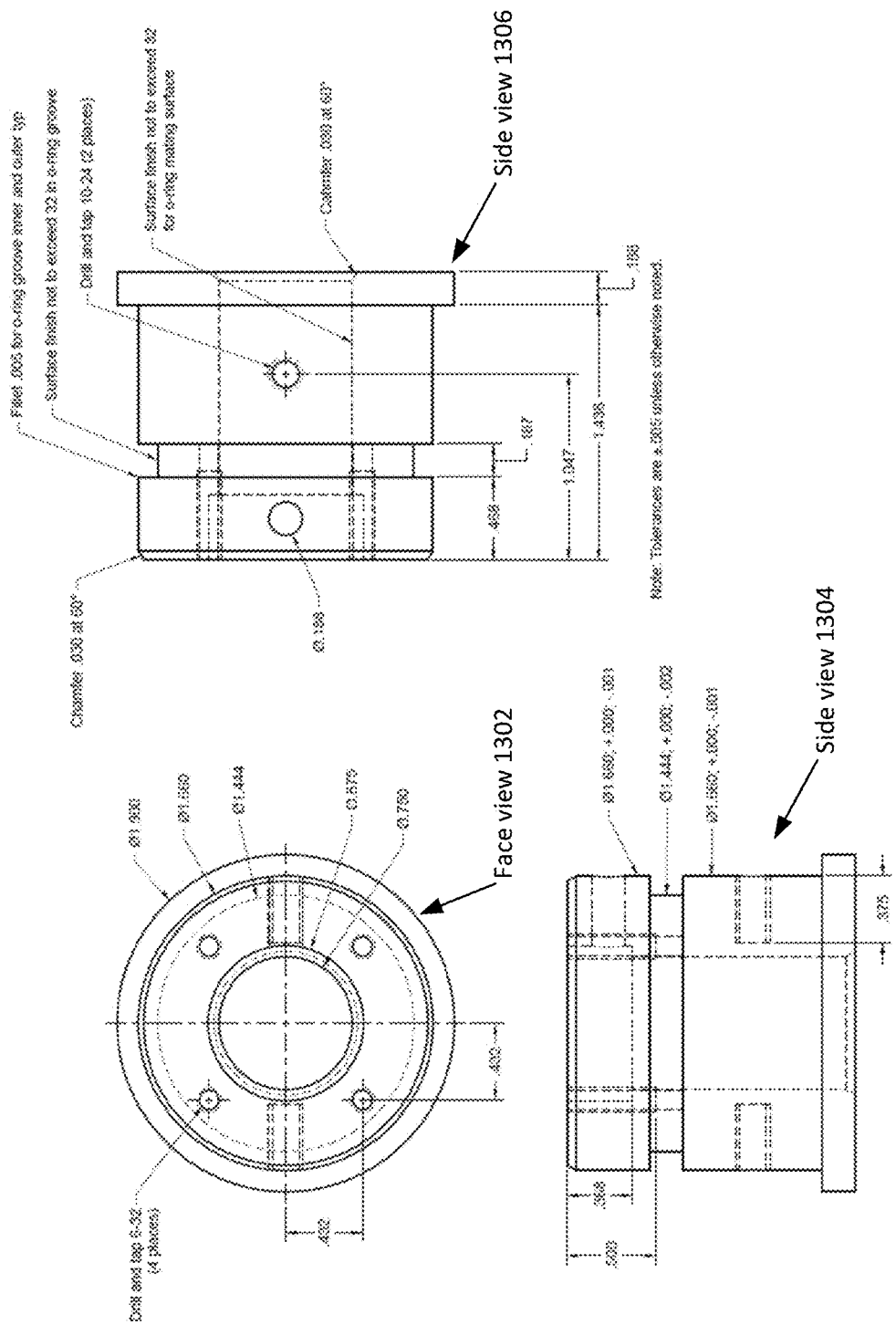
FIG. 13 depicts views of the motor end plug for holding the motor in some embodiments.

FIG. 13 depicts views of the motor end plug 206 for holding the motor in some embodiments. FIG. 13 includes a face view 1302, a first orientation side view 1304, and a second orientation side view 1306. The measurements of the motor end plug may also be in inches.

FIG. 14 depicts a process for setting a timer of the line restraint device 200 in some embodiments. The timer may be set without a separate programmer or disposable parts.

In some embodiments, the user may turn the arm 1004 to arm the line restraint device 200, disarm the line restraint device 200 and/or the set the timer. The figures in FIG. 14 depict a top view from the top end of the line restraint device 200. The top end of the line restraint device 200 includes the outer surface of the arm 1004. The red arrows depict the direction that the user may turn the arm 1004 (and turn the release cam 208).

In the first figure, the user may turn the arm 1004 in either direction until the display 912 depicts "arm/set." It will be appreciated that the display 912 may display "set" or any information. In this example, once the display 912 indicates that the timer may be set, the user may turn or rotate the release cam 208 (by turning the arm 1004) until the desired time appears. The set time may include a specific time or a duration in the future (e.g., within 2 hours) when the timer will expire which will trigger the release cam 208 to rotate into he open state to release the release line 302 from the cavity.

In some embodiments, there line restraint device 200 may include a variety of presets, each of which may be a different time or duration in the future (e.g., 1 hour, 2 hours, 20 minutes, 40 minutes, 3 hours, four hours, five hours, six hours, seven hours, eight hours, ten hours, twelve hours, 1 day, 2 days, or the like). In one example, the user may turn the arm 1004 to select a different preset.

Once the desired time or preset is displayed, the user may wait a set duration (e.g., three seconds or any amount of time) to store the time. Once the time is stored, the display 912 may display "arm/set."

FIG. 15 depicts a process for arming the line restraint device 200 in some embodiments. After the time is set, the user may turn the arm 1004 until the "arm display" appears in the display 912 and the arm 1004 is short of the release line retainer 210 (e.g., there is still access for the release line 302 to be placed within the cavity). The user may then place a loop of the release line 302 in the cavity and then move the arm 1004 over the loop of the release line 302 (e.g., to the closed state when the arm 1004 extends to or near the release line retainer 210 and the face 1006 of the arm 1004 faces the release line retainer 210 or a portion of the release line retainer 210). In some embodiments, if the arm 1004 is turned such that the face 1006 faces the release line retainer 210, the user may wait a predetermined period of time (e.g., 10 seconds) and the display 912 may display "armed."

When the line restraint device 200 is in a closed state, the arm 1004 is directed to the release line retainer 210 (e.g., the face 1006 of the arm 1004 may be directed to and/or proximate to a portion of the release line retainer 210). The "closed" state is the "armed" state as displayed on the display 912.

It will be appreciated that to minimize programming time, the timer may automatically reset to the same time/duration as the previous deployment, or it can be quickly reprogrammed by rotating the cam (using an encoder attached to the motor).

Figure 16:
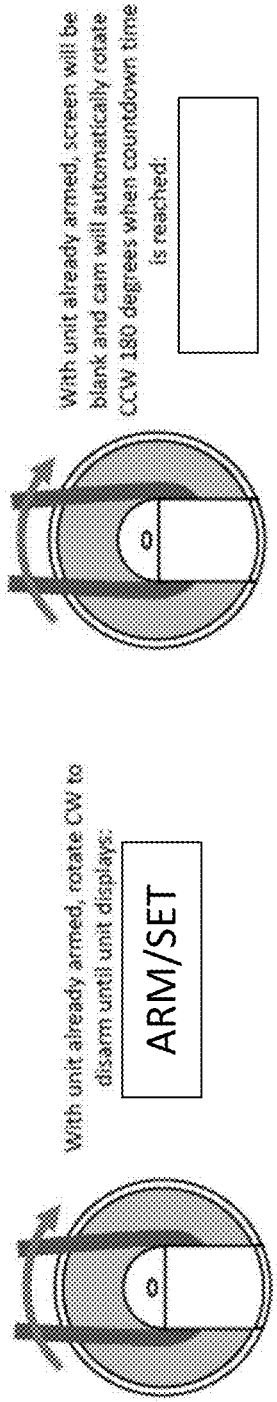
FIG. 16 depicts a process for disarming the line restraint device in some embodiments.

FIG. 16 depicts a process for disarming the line restraint device 200 in some embodiments. After the line restraint device 200 is armed, the user may disarm the line restraint device 200 by turning the arm 1004 until the display 912 displays "disarm" or "arm/set." By turning the arm 1004, the release line 302 may be released from the cavity.

Once set and armed, the display 912 may be blank or may turn blank after a predetermined period of time. Similarly, once disarmed, after a predetermined period of time, the display 912 may turn blank.

Figure 17:
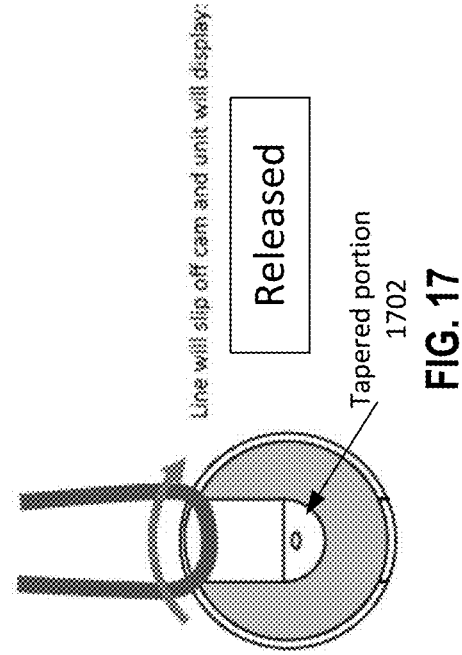
FIG. 17 depicts a process for releasing the release line from the cavity formed at least in part by the release cam in some embodiments.

FIG. 17 depicts a process for releasing the release line 302 from the cavity formed at least in part by the release cam 208 in some embodiments. In various embodiments, the timer of the line restraint device 200 may trigger the release cam 208 to move (e.g., rotate) at the pop-up time (e.g., the pop-up time being set by the user as discussed for example herein). At the time, with the line restraint device 200 already armed, the display 912 may be blank and the control and power PCB 918 may trigger the motor 908 to turn the arm 1004 to release the loop of the release line 302. In some embodiments, when the arm 1004 is turned to release the release line 302 (e.g., the arm is turned 180 degrees), the display may optionally display "Released."

The float may pull on the trap line, which is coiled and held in place, at least in part, by the release line 302. When the release line 302 is released by the line restraint device 200, the float may pull the trap line which may force and/or pull the release line 302 out of the cavity. In various embodiments, the release cam 208 includes a tapered portion 1702 that may incline from the arm 1004 (e.g., opposite the face 1006) to the opposite edge of the stem portion 1002. The tapered portion 1702 may assist the release line 302 to pull free from the cavity and slide over all or part of the tapered portion 1702. The tapered portion 1702 may be at any angle and may be sloped such that the part of the tapered portion 1702 closest to the arm 1004 is upward, away from the housing, and the opposite part of the tapered portion 1702 closest to the stem portion 1002 is downwards, towards the housing.

The following is a setup of the line restraint device 200 in one example. In step 1, the user turns on the line restraint device 200 be turning the arm 1004 and/or inserting the screwdriver and rotating the cam either direction at least 90 degrees. In step 2, when the "ARM/SET" notice displays, user may turn the arm 1004 or use the screwdriver to rotate the release cam 208 until the time displays in format DD HH.MM. The user may then rotate the arm 1004 of the release cam 208 clockwise to increase the time, or counterclockwise to decrease the time. The user may wait a predetermined period of time (e.g., 3 seconds) to be accepted by the unit and the line restraint device 200 may again display "ARM/SET." In step 3, the user may coil the trap line 506 in a coil (e.g., with diameter of approximately 18 inches) and place the coil on top of the aquatic trap 306. In step 4, the user may feed the release line 302 through a loop at the base of the float and then under a section of the aquatic trap 306 (e.g., within the wiring of the aquatic trap 306) that is in the center of the trap line 506 coil. In step 5, the user may stretch the release line 302 (e.g., a loop of the release line 302) over a part of the trap line 506 coil pulling the release loop of the release line 302 toward the release cam 208 of the line restraint device 200. The user may turn the release cam 208 or use a screwdriver to rotate the release cam 208 in a direction or either direction until "ARM/SET" displays. The user may rotate the release cam 208 counterclockwise until the line restraint device 200 displays "ARM UNIT" and the release cam 208 is just about to engage with the portion of the release line retainer 210 extending from the housing of the line restraint device 200. The user may loop the release line 302 under the release cam 208 and complete the rotation of the arm 1004 to the armed position with the release cam 208 (e.g., the arm 1004 of the release cam 208) pointing down towards the release line retainer 210. After a predetermined period of time (e.g., 10 seconds), the TR4RT display may indicate "ARMED" The line restraint device 200 may be ready to be deployed.

In various embodiments, a geolocation system may be utilized. An app on a smartphone, smart table, personal computer, or the like may display a map. When an aquatic trap 502 is deployed, the user may press a deploy button on the app screen and the trap, location, deployment time and/or pop-up time may be submitted to a database via cellular link. If the boat is outside of cell range, the submission can be supplemented by satellite link or the submission can be buffered and submitted when cell communication is restored. When the aquatic trap 502 is recovered, the user may press a retrieve button on the app screen and the database may be updated to indicate the time the trap had been removed.

The app can also be used to access trap locations from the database in the vicinity of the boat to help avoid interference. A radial distance from existing traps may be designated, and the user may be notified by the central system (e.g., in communication with the database) and/or the app via a warning on the app screen if the user is deploying too close to an existing trap location.

In various embodiments, the database and information identifying location and identity of the aquatic traps may be used by regulators to assist in assessing placement of traps by permit time, area, and the like. Regulators may be able to export information and perform statistical analysis to determine total traps, soak times, and the like. The information may be available to regulators and law enforcement in real-time (e.g., as soon as an aquatic trap 502 is deployed, the database may be updated and that information may be provided immediately to or at the request of regulators and/or law enforcement).

While many embodiments discussed herein depict the release cam 208 turning to open the cavity, it will be appreciated that any movable device or articulation may operate to open or close to hold the release line 302. Further, in some embodiments, rather than the release cam 208 moving, any component or combination of components may move to release the release line 302. For example, the release line retainer 210 may move (e.g., the motor may rotate the release line retainer 210 around the line restraint device 200) to release the release line 302.

Figure 18:
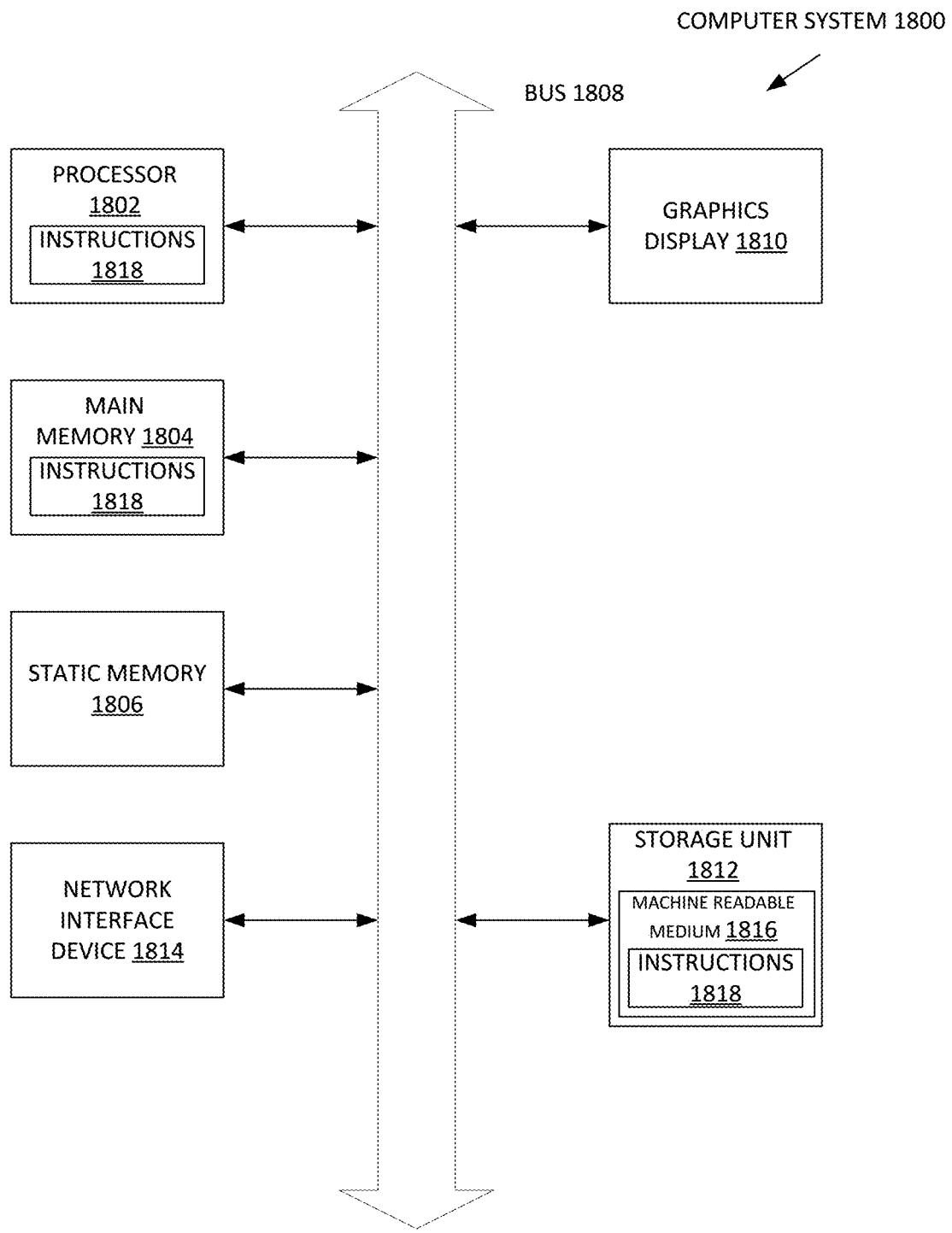
FIG. 18 is a block diagram illustrating entities of an example digital device able to read instructions from a machine-readable medium and execute those instructions in a processor to perform the machine processing tasks discussed herein, such as the engine operations discussed above.

FIG. 18 is a block diagram illustrating entities of an example digital device able to read instructions from a machine-readable medium and execute those instructions in a processor to perform the machine processing tasks discussed herein, such as the engine operations discussed above. Specifically, FIG. 18 shows a diagrammatic representation of a digital device in the example form of a digital device 1800 within which instructions 1824 (e.g., software) for causing the machine to perform any one or more of the methodologies discussed herein may be executed. In alternative embodiments, the machine operates as a standalone device or may be connected (e.g., networked) to other machines, for instance, via the Internet.

The digital device may include a processor and memory any may include a PIC, processor, raspberry PI, or the like.

The example digital device 1800 includes a processor 1802 (e.g., a central processing unit (CPU), a graphics processing unit (GPU), a digital signal processor (DSP), one or more application-specific integrated circuits (ASICs), one or more radio-frequency integrated circuits (RFICs), or any combination of these), a main memory 1804, and a static memory 1806, which are configured to communicate with each other via a bus 1808. The digital device 1800 may further include a graphics display unit 1810 (e.g., a plasma display panel (PDP), a liquid crystal display (LCD), a projector, or a cathode ray tube (CRT)). The digital device 1800 may also include a data store 1812 and a network interface device 1814, which also are configured to communicate via the bus 1808.

The data store 1812 includes a machine-readable medium 1816 on which is stored instructions 1818 (e.g., software) embodying any one or more of the methodologies or functions described herein. The instructions 1818 (e.g., software) may also reside, completely or at least partially, within the main memory 1804 or within the processor 1802 (e.g., within a processor's cache memory) during execution thereof by the digital device 1800, the main memory 1804 and the processor 1802 also constituting machine-readable media. The instructions 1818 (e.g., software) may be transmitted or received over a network (not shown) via optional network interface 1814.

While machine-readable medium 1816 is shown in an example embodiment to be a single medium, the term "machine-readable medium" should be taken to include a single medium or multiple media (e.g., a centralized or distributed database, or associated caches and servers) able to store instructions (e.g., instructions 1818). The term "machine-readable medium" shall also be taken to include any medium that is capable of storing instructions (e.g., instructions 1818) for execution by the digital device and that cause the machine to perform any one or more of the methodologies disclosed herein. The term "machine-readable medium" includes, but should not be limited to, data repositories in the form of solid-state memories, optical media, and magnetic media.

Figure 19:
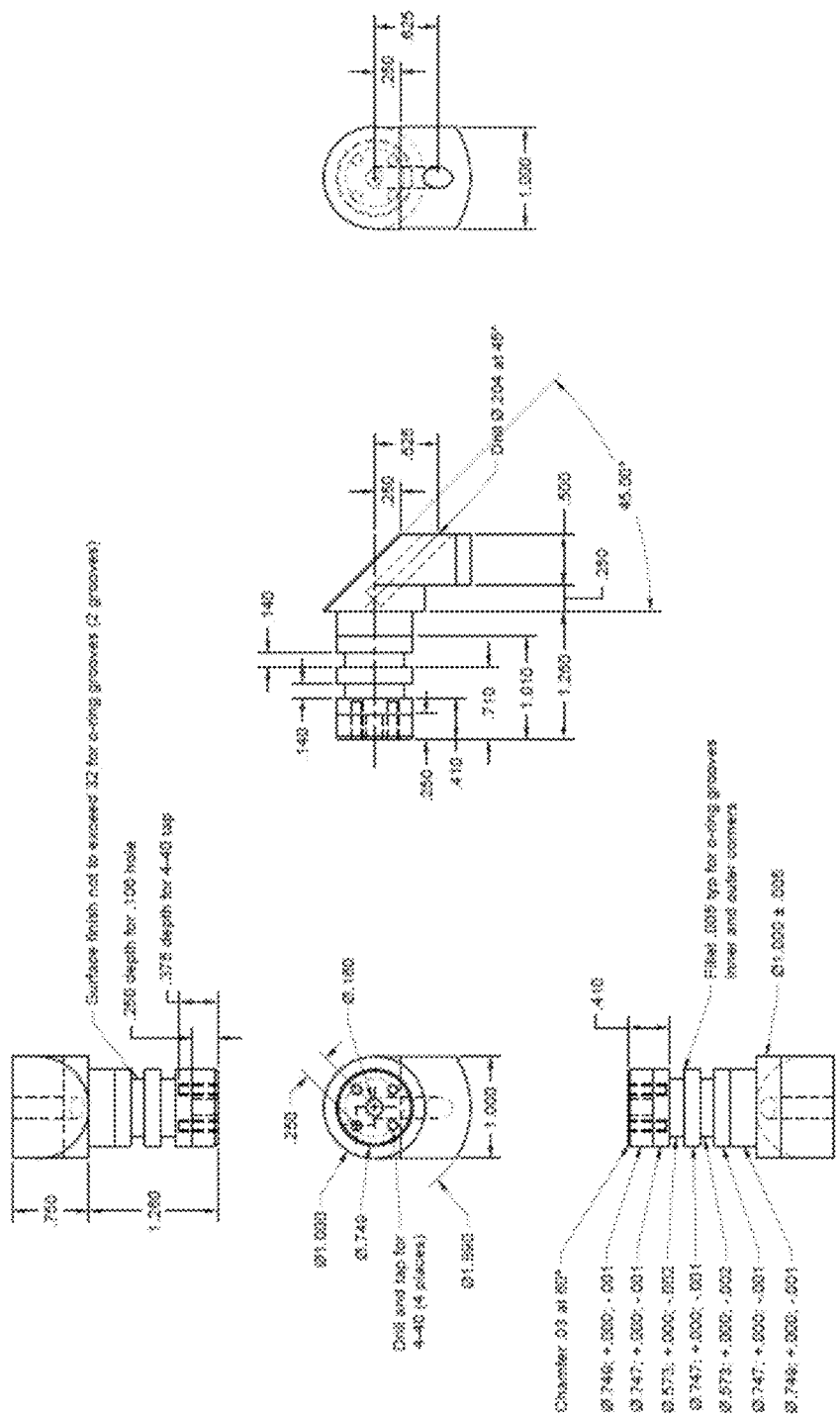
FIG. 19 depicts different views of the release cam in an embodiments.

FIG. 19 depicts different views of the release cam 208 in an embodiments. Measurements may be in inches. Some of the views depict the step as well as clearances for coupling the step to the motor 908 and/or axel.

It will be appreciated that the housing 202, end cap 204, release cam 208, and motor mount may, in some embodiments, be made using a 3D printer or a PW machine. The motor 908 may be a 116 RPM premium planetary gear motor with encoder (e.g., the motor 908, planetary gear 906, and encoder 910 maybe together). Each bulkhead 914 and 920 may be, for example, 3D print 6 g of filament per unit—HATCHBOX PLA 3D Printer Filament, Dimensional Accuracy +/−0.03 mm, 1 kg Spool, 1.75 mm. The control and power PCB 918 may be from CBS electronics.

The following are further examples of possible components of the line restraint device 200:

| | |
|---|---|
| Batteries | Energizer AA ultimate |
| End Cap O-rings | McMaster Oil-Resistant Buna-N O-Ring, ⅛ Fractional Width, Dash Number 221 |
| Release Cam O-rings | McMaster Oil-Resistant Buna-N O-Ring, 3/32 Fractional Width, Dash Number 113 |
| End Cap Fasteners | McMaster Button Head Hex Drive Screw, 10-24 Thread Size, ⅝" Long |
| End Cap Fasteners | McMaster Button Head Hex Drive Screw, 10-24 Thread Size, ½" Long |
| Motor Mount Fasteners | McMaster M2 × 0.4 mm Thread, 6 mm Long |
| Motor Mount/Bulkhead Fasteners | McMaster 6-32 Thread Size, 4" Long |
| Motor Mount/Bulkhead Fasteners | McMaster Narrow Hex Nut, 6-32 Thread Size |
| Motor Mount/Bulkhead Fasteners | McMaster Split Lock Washer for Number 6 Screw Size |
| Motor Mount/Bulkhead Fasteners | 18-8 Stainless Steel Nylon-Insert Locknut, 6-32 Thread Size |
| Circuit/Battery Mount Fasteners | McMaster Phillips Flat Head Screw, Passivated, 4-40 Thread Size, 5/16" Long |
| Circuit/Battery Mount Fasteners | McMaster Hex Nut, 4-40 Thread Size |
| Motor Hub Fasteners | McMaster Flat Head Screw, Passivated, 4-40 Thread Size, ½" Long |
| Cam Retainer Washers | McMaster Washer for Number 4 Screw Size |
| Motor Hub Set Screws | 18-8 Stainless Steel Cup-Point Set Screw, 4-40 Thread, 1/16" Long |
| Motor Hub Set Screws | 18-8 Stainless Steel Cup-Point Set Screw, 4-40 Thread, 3/32" Long |

In this description, the term "module" refers to computational logic for providing the specified functionality. A module can be implemented in hardware, firmware, and/or software. Where the modules described herein are implemented as software, the module can be implemented as a standalone program, but can also be implemented through other means, for example as part of a larger program, as any number of separate programs, or as one or more statically or dynamically linked libraries. It will be understood that the named modules described herein represent one embodiment, and other embodiments may include other modules. In addition, other embodiments may lack modules described herein and/or distribute the described functionality among the modules in a different manner. Additionally, the functionalities attributed to more than one module can be incorporated into a single module. In an embodiment where the modules as implemented by software, they are stored on a computer readable persistent storage device (e.g., hard disk), loaded into the memory, and executed by one or more processors as described above in connection with FIG. 18. Alternatively, hardware or software modules may be stored elsewhere within a computing system.

As referenced herein, a computer or computing system includes hardware elements used for the operations described here regardless of specific reference in FIG. 18 to such elements, including, for example, one or more processors, high-speed memory, hard disk storage and backup, network interfaces and protocols, input devices for data entry, and output devices for display, printing, or other presentations of data. Numerous variations from the system architecture specified herein are possible. The entities of such systems and their respective functionalities can be combined or redistributed.

The invention claimed is:

1. A line restraint system comprising:
a housing;
a processor;
a motor contained within the housing, the housing sealing the motor and the processor from getting wet when the housing is submerged;
a release cam extending from the housing, the release cam comprising a stem portion and an arm portion opposite the stem portion, the stem portion being proximate to the housing, the arm portion being opposite the stem portion and away from the housing, the arm portion extending away from the stem portion of the release cam, the stem portion being rotatably coupled to the motor, the motor being configured to turn the arm portion of the release cam between an open and closed state, when in the closed state, an overhang of the arm portion of the release cam at least partially defining a cavity capable of retaining a release line, when in the open state, the release cam opening the cavity to enable release of the release line; and
a timer contained within the housing, the timer being configured to receive instructions from the processor to set a particular time and capable of triggering the motor to turn the release cam from the closed state to the open state at the particular time.

2. The line restraint system of claim 1, further comprising a release line retainer coupled to the line restraint system, a portion of the release line retainer extending from the housing, and wherein in the closed state, the arm portion of the release cam being directed towards the release line retainer, the release line retainer and the overhang of the arm portion of the release cam at least partially defining the cavity.

3. The line restraint system of claim 1, wherein the line restraint system is capable of being coupled to an aquatic trap and capable of holding a release line in the cavity when the line restraint system is in the closed stated, thereby enabling a trap line coupled to a buoy to be restrained from rising when the aquatic trap is deployed underwater.

4. The line restraint system of claim 1, wherein the particular time is an amount of time that must pass until the timer triggers the motor.

5. The line restraint system of claim 1, wherein the particular time is a chronological time that must be reached until the timer triggers the motor.

6. The line restraint system of claim 1, wherein the processor is further configured to set the particular time through movement of the release cam.

7. The line restraint system of claim 6, wherein the processor being further configured to set the particular time comprises the processor receiving a first signal to change the particular time based on a clockwise turn of the release cam.

8. The line restraint system of claim 6, wherein the processor being further configured to set the particular time comprises the processor configured to set the particular time based on a first turn of the release cam, to increase the particular time based on a clockwise turn of the release cam, to decrease the particular time based on a counterclockwise turn of the release cam, and store the particular time based on inaction of the release cam for a particular duration.

9. The line restraint system of claim 1, wherein the line restraint system is capable of being coupled to at least one bar within an inside of an aquatic trap, the aquatic trap comprising the at least one bar within its structure.

10. A method comprising:
receiving, by a processor of a line restraint system, a signal to set a timer, the line restraint system including a housing, the processor being within the housing;
setting, by the processor, a particular time to trigger a motor to turn a release cam of the line restraint system, the motor being within the housing, the housing sealing the processor and the motor from getting wet when the housing is submerged;
triggering, by the processor, the motor to turn the release cam when the particular time is reached, the release cam extending from the housing, the release cam comprising a stem portion and an arm portion opposite the stem portion, the stem portion being proximate to the housing, the arm portion being opposite the stem portion and away from the housing, the arm portion extending away from the stem portion of the release cam, the stem portion being rotatably coupled to the motor; and
turning, by the motor, the arm portion of the release cam from a closed state to an open state, when in the closed state, an overhang of the arm portion of the release cam at least partially defining a cavity that is enclosed and capable of retaining a release line, when in the open state, the cavity is no longer enclosed to enable release of the release line.

11. The method of claim 10, wherein the line restraint system further comprises a release line retainer affixed outside of the housing, a portion of the release line retainer extending from the housing, and wherein in the closed state, the arm portion of the release cam being directed towards the release line retainer, the release line retainer and the overhang of the arm portion of the release cam at least partially defining the cavity that is enclosed.

12. The method of claim 10, wherein the line restraint system is capable of being coupled to an aquatic trap and capable of holding a release line in the cavity when the line restraint system is in the closed stated, thereby enabling a trap line coupled to a buoy to be restrained from rising when the aquatic trap is deployed underwater.

13. The method of claim 10, wherein the particular time is an amount of time that must pass until the timing device triggers the motor.

14. The method of claim 10, wherein the particular time is a chronological time that must be reached until the timer triggers the motor.

15. The method of claim 10, wherein the signal is generated from manual movement of the release cam.

16. The method of claim 10, wherein the signal is generated from a manual, clockwise movement of the release cam.

17. The method of claim 10, wherein the signal is generated from a manual, clockwise movement of the release cam to increase the particular time.

18. The method of claim 10, wherein the signal is generated from a manual, counterclockwise movement of the release cam to decrease the particular time.

19. The method of claim 10, wherein the line restraint system is capable of being coupled to at least one bar within an inside of an aquatic trap, the aquatic trap comprising the at least one bar within its structure.

* * * * *